June 3, 1958

A. H. DICKINSON ET AL 2,837,279

DATA PROCESSING MACHINE

Filed Dec. 31, 1954

INVENTORS
ARTHUR H. DICKINSON
ROBERT I. ROTH

BY *Lee Clifford*

ATTORNEY

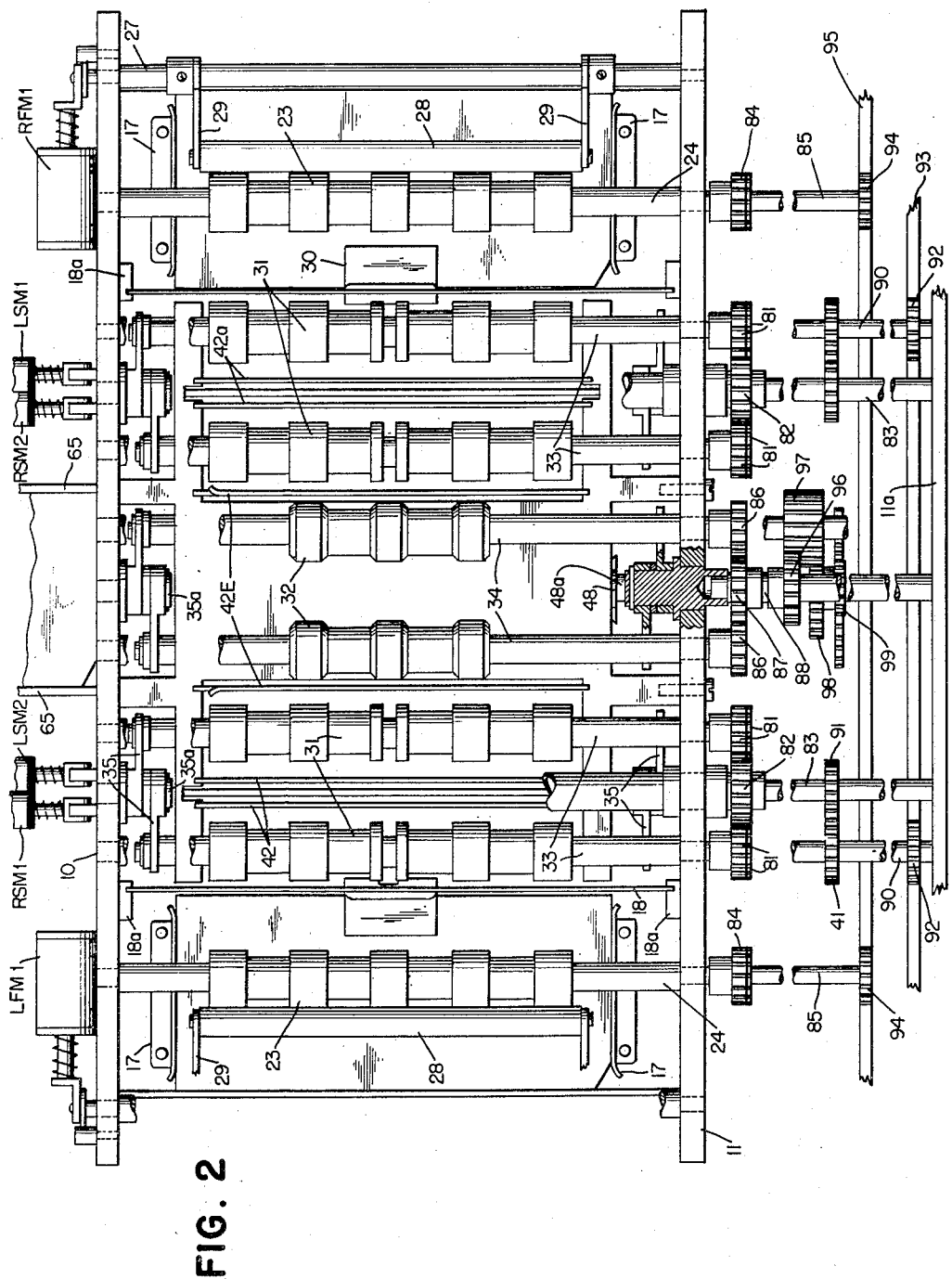

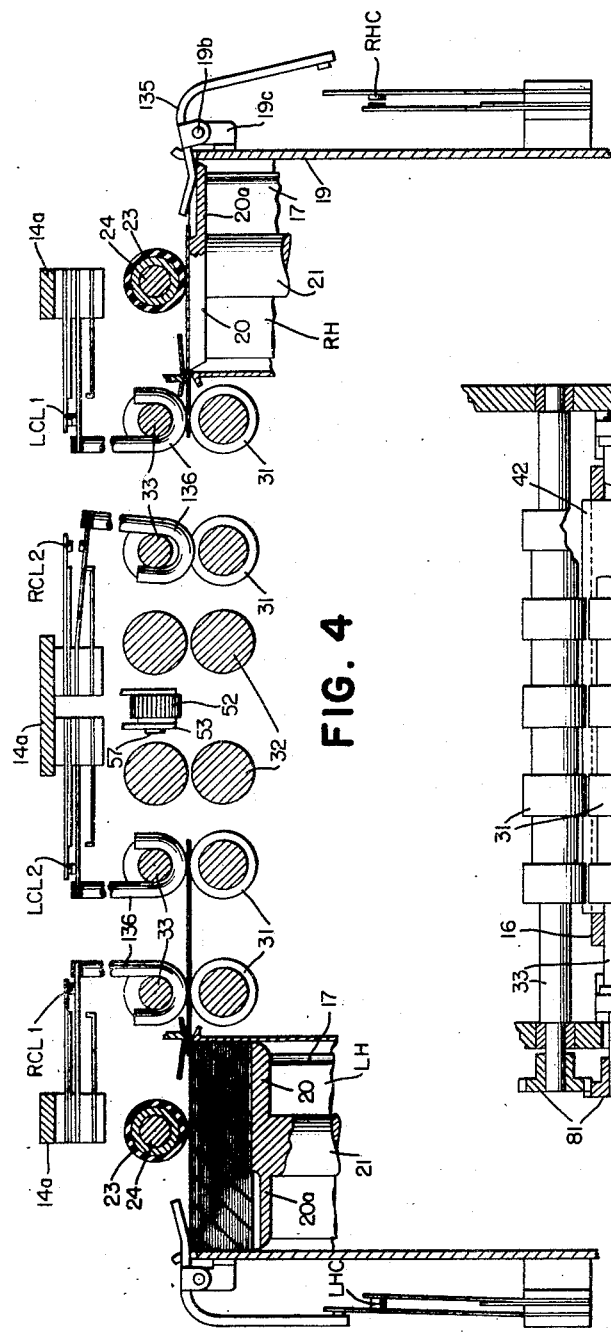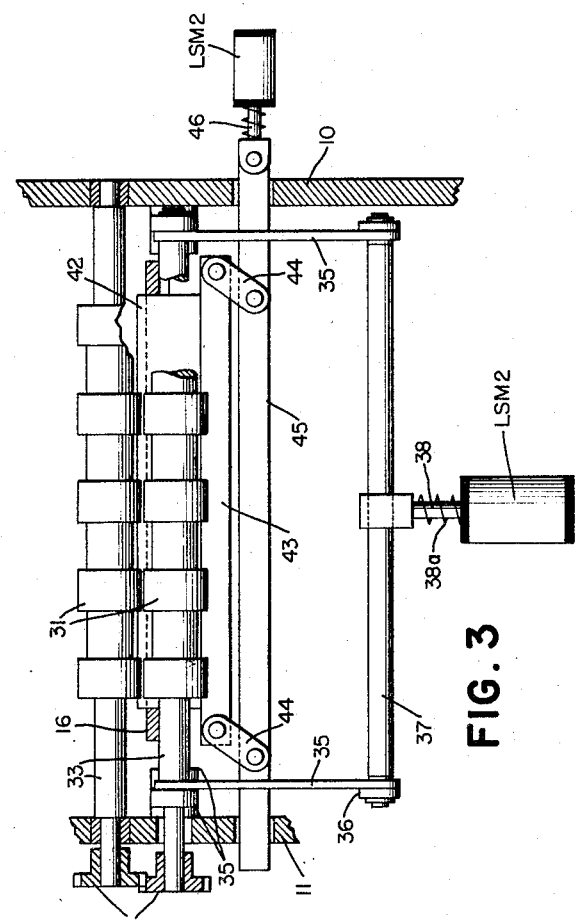

FIG. 7E

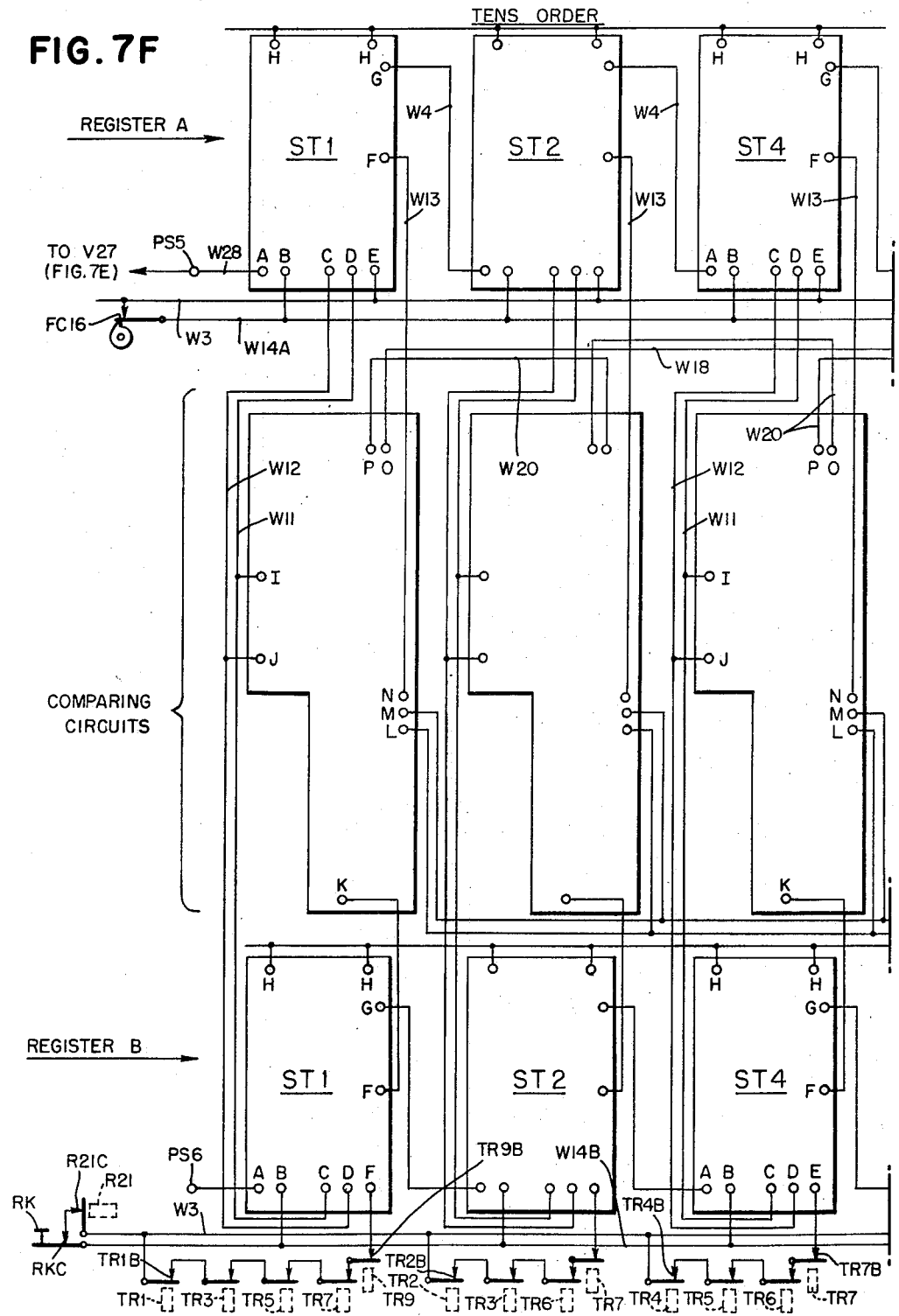

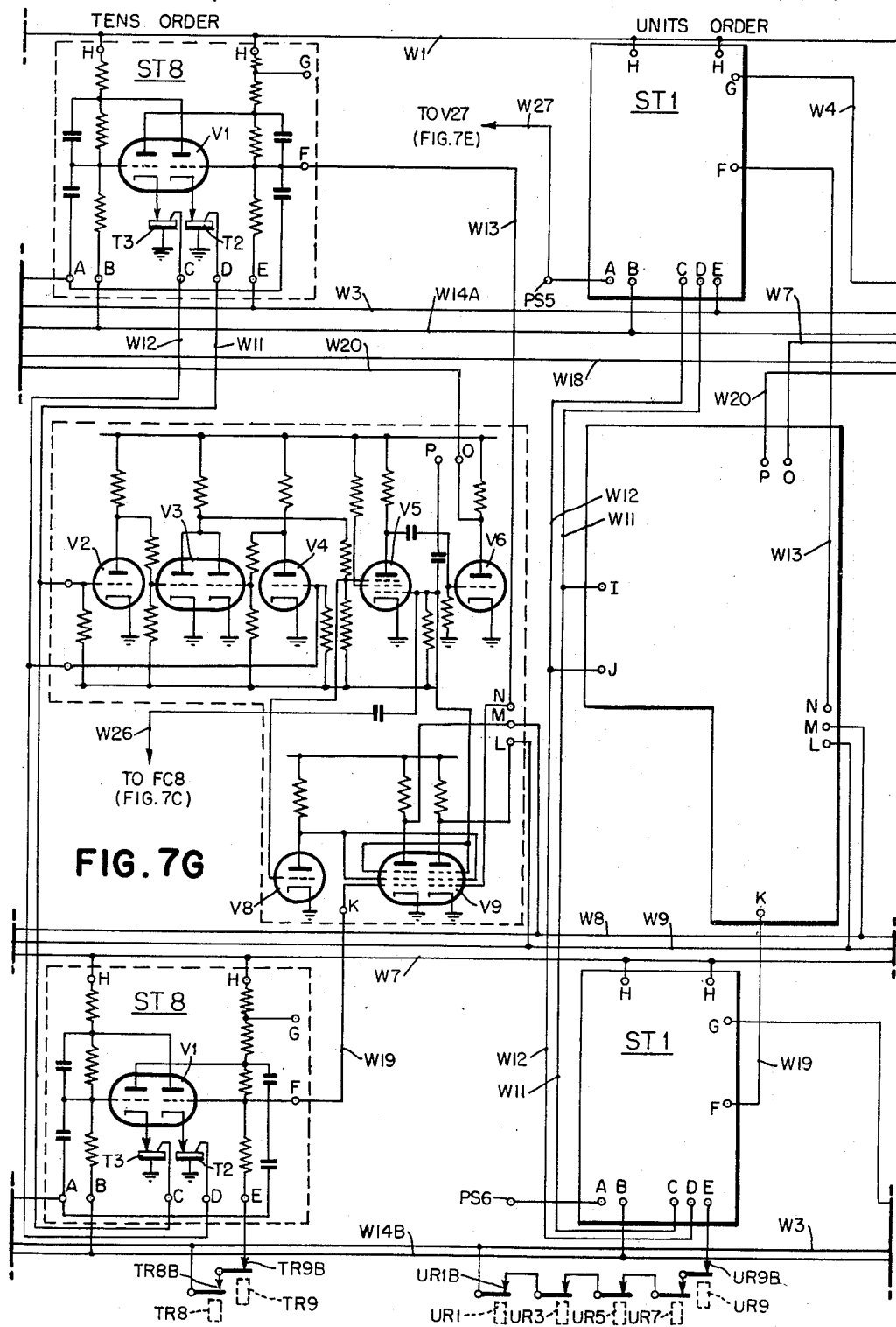

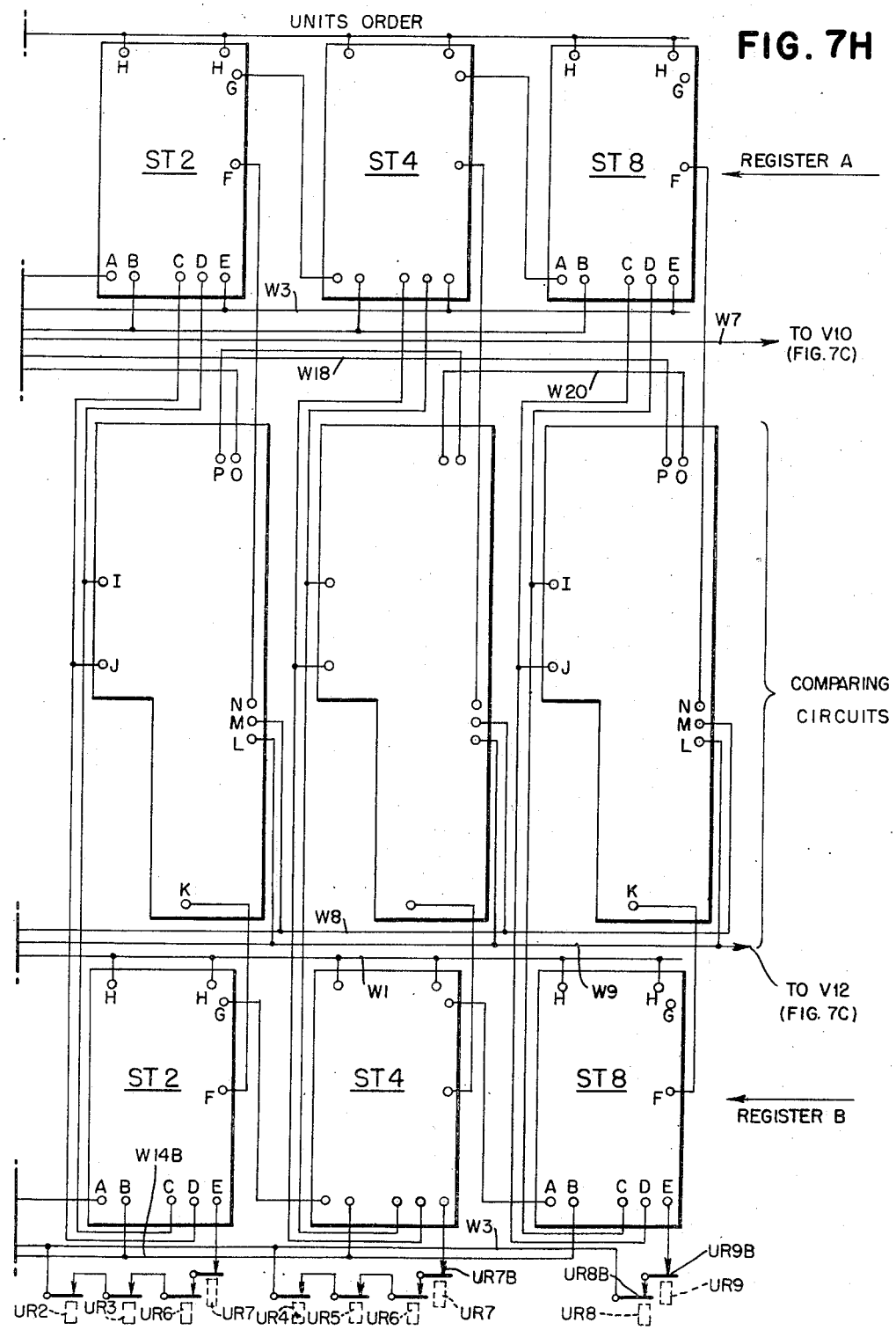

June 3, 1958

A. H. DICKINSON ET AL 2,837,279

DATA PROCESSING MACHINE

Filed Dec. 31, 1954

| FIG. 7A<br>CARD FEED<br>CONTROLS | FIG. 7B<br>CARD FEED<br>CONTROLS | FIG. 7C<br>CARD FEED<br>CONTROLS | FIG. 7D<br>MASTER OSCILLATOR<br>ENTRY PULSE TIMING COUNTER | FIG. 7E<br>PHOTO CELLS AND AMPLIFIERS<br>PRIMARY ENTRY CONTROL CIRCUITS |
|---|---|---|---|---|
| FIG. 7F<br>REGISTER A<br>TENS ORDER STAGES ST1, ST2, ST4<br>REGISTER B | FIG. 7G<br>REGISTER A<br>TENS ORDER STAGES ST8<br>UNITS ORDER STAGES ST1<br>REGISTER B | FIG. 7H<br>REGISTER A<br>UNITS ORDER STAGES ST2, ST4, ST8<br>REGISTER B | FIG. 7I<br>KEY BOARD | |

INVENTORS
ARTHUR H. DICKINSON
ROBERT I. ROTH

BY *[signature]*

ATTORNEY

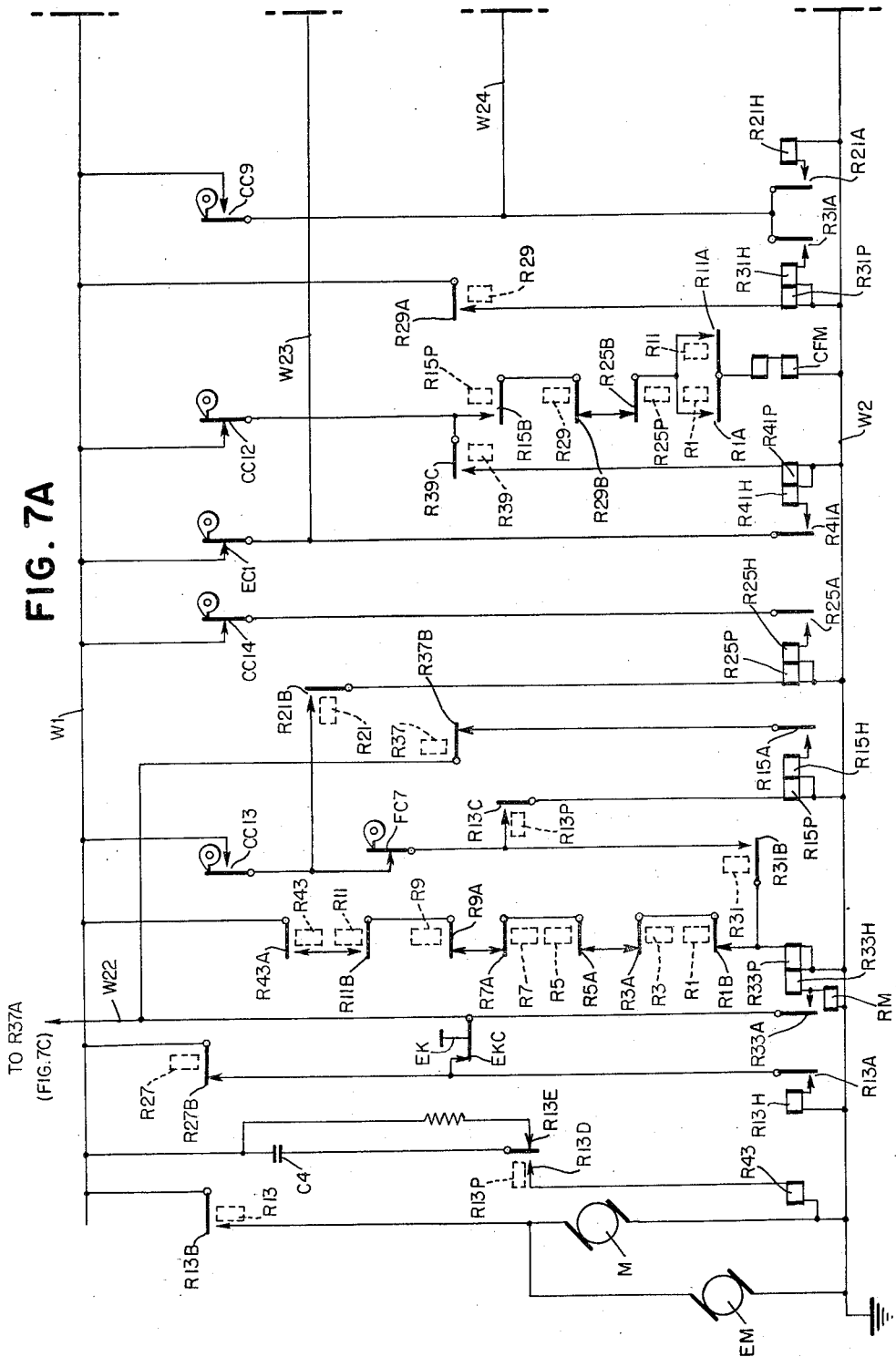

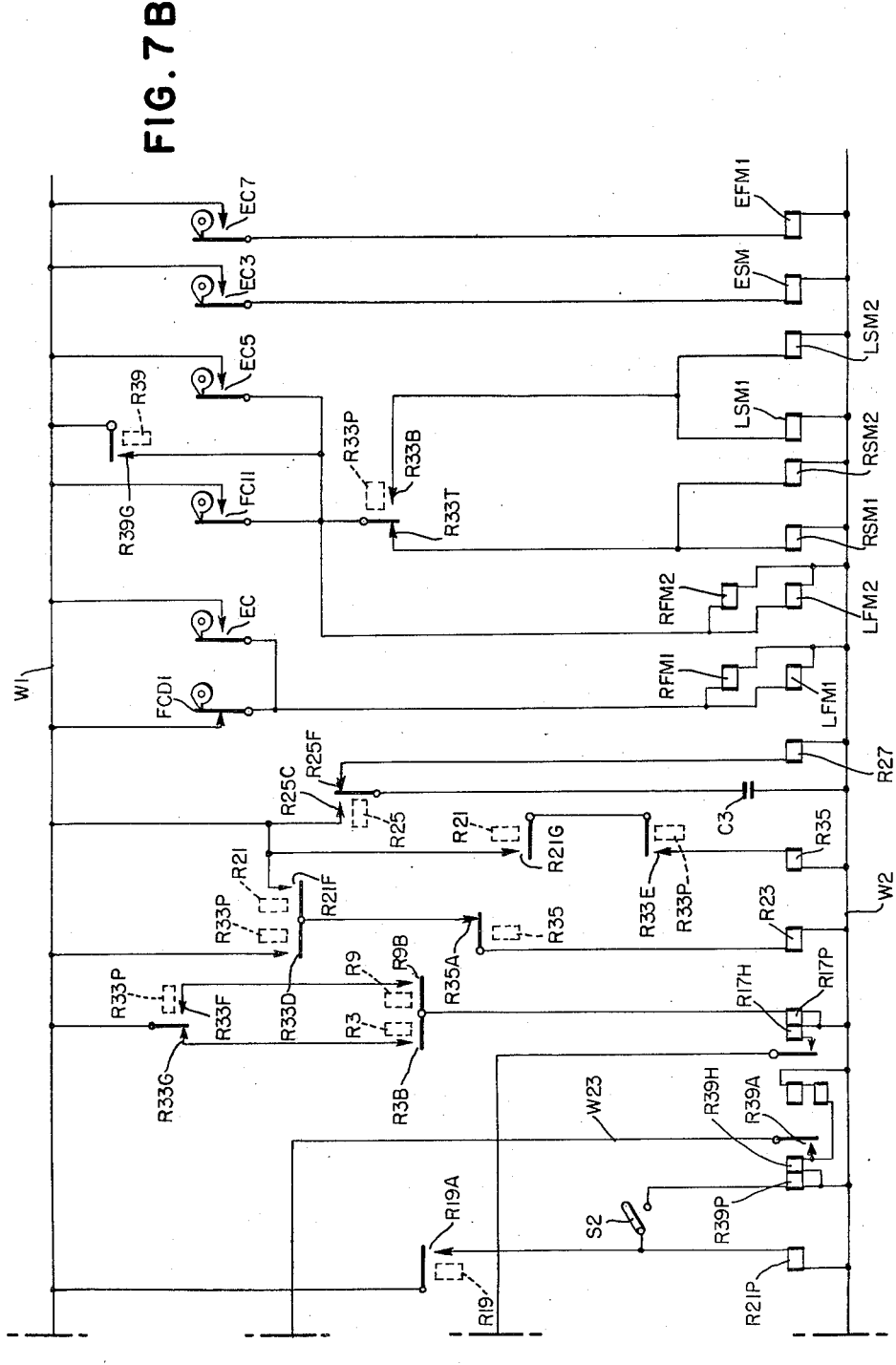

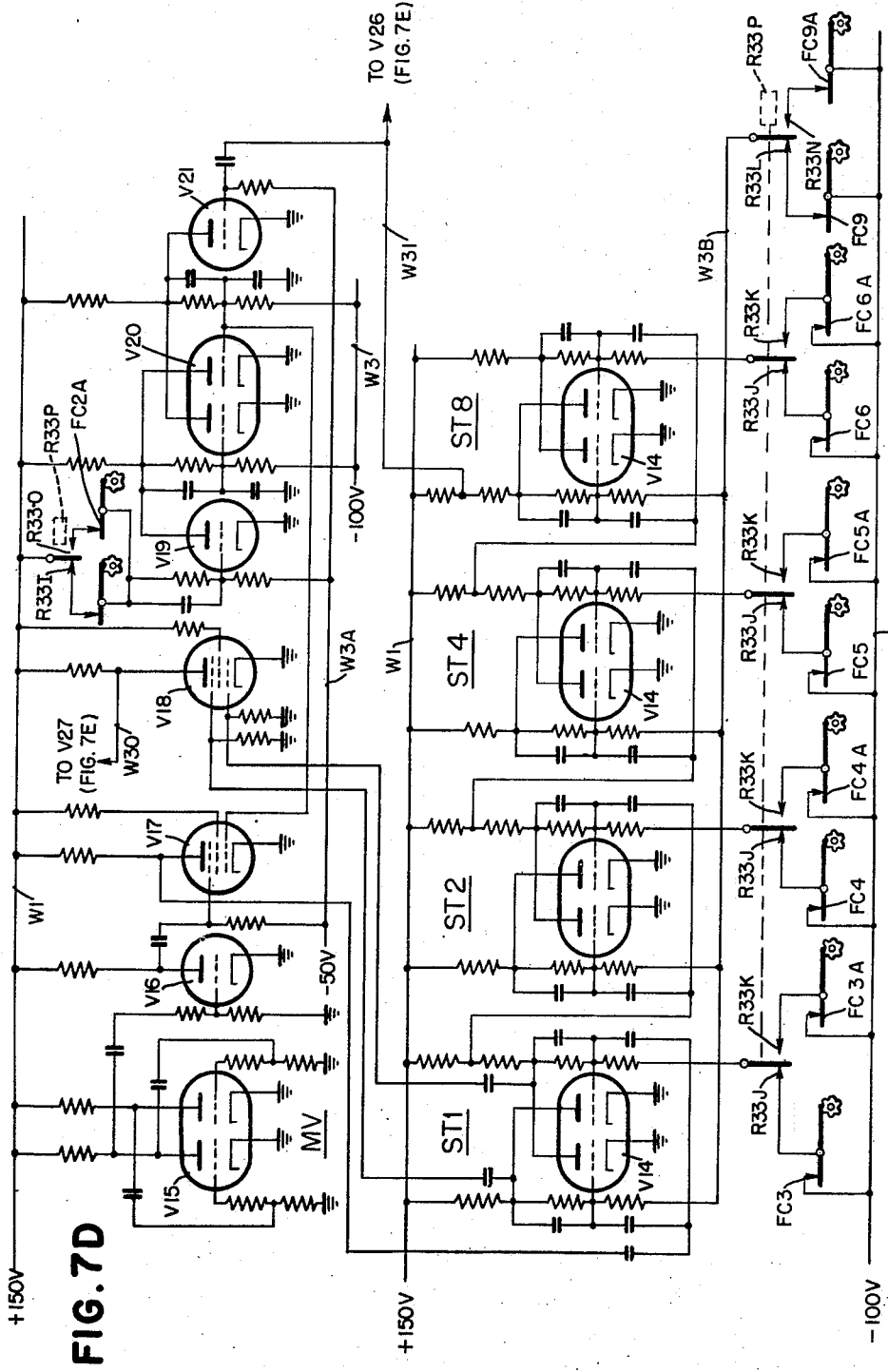

United States Patent Office 2,837,279
Patented June 3, 1958

2,837,279

DATA PROCESSING MACHINE

Arthur H. Dickinson, Greenwich, Conn., and Robert I. Roth, Mount Pleasant, N. Y., assignors to International Business Machines Corporation, New York, N. Y., a corporation of New York Application December 31, 1954, Serial No. 479,193

17 Claims. (Cl. 235—61.7)

This invention relates to data processing machines and more particularly to the provision of an improved storage device useful in such machines.

An object of the invention is to provide a storage device which permits data recorded by means of conventional accounting and statistical record cards to be quickly located and utilized in other equipment, for example, the electronic computing equipment of an electronic data processing machine.

An object is to provide a storage device in which cards containing data may be scanned repeatedly for the location of pertinent data which is identified in the record cards by suitable address indicia.

An object is to provide a storage device which contemplates feeding a batch of record cards containing data in either of two directions for the purpose of searching for pertinent data identified by address indicia.

An object is to provide a novel card feeding and sensing mechanism which contemplates repeated sensing of the records in either of two directions along a feed path for the purpose of locating pertinent data identified on individual records by means of address indicia.

An object is to provide a card storage device which comprises two separate card hoppers or pockets with a record feeding and sensing mechanism therebetween arranged to enable the cards to be passed from one pocket or hopper to the other and sensed for the purpose of locating particular cards having data identified in the cards by suitable address indicia.

An object is to provide a mechanism of the foregoing type in which means is provided for the ejection of cards according to the identifying indicia thereon and the possible replacement of each card ejected from the batch with another card.

An object is to provide a machine in which cards may be repeatedly sensed in a search for cards having particular data arranged so that the selected cards may be ejected for the purpose of further processing the data or the further disposition of the selected card in accordance with such data.

An object is to provide a mechanism of the type disclosed above which is capable of selecting at will cards in accordance with identifying indicia according to which indicia the cards are arranged in sequence or in accordance with a random arrangement of the cards.

An object is to provide a storage device employing conventional accounting and statistical record cards as a storage media in which a plurality of record sensing stations is provided to enable the searching for, and subsequent utilization of, data identified on the cards by address indicia.

An object is to provide a card feeding and sensing mechanism in which the cards may be fed in either direction and embodying two successive card sensing mechanisms with means to alternatively selectively connect the record sensing stations to data searching means and to data processing means in accordance with the direction of feed of the cards.

Ordinarily in machines employing record cards in which data designations disposed differentially with respect to one edge of the cards are employed, the designations are sensed in a predetermined sequence. For example, in the machines utilizing the well-known Hollerith cards, it is common to sense the index point positions in the card in the order 9, 8, 7 * * * 0, or alternatively, in the order 12, 11, 0 * * * 8, 9; and are most frequently designated to be operated in accordance with the first of these systems of sensing. Where it is necessary to reverse the feed of the cards and resense them for the purpose of effecting a selection of data, it is necessary to provide a means of changing the time significance of the data designations in relation to the sensing means controlled thereby. For example, a "9" hole in a conventional punched card would be sensed as "9" in one direction, and as "12" in the opposite direction if the direction of feed of the card were reversed. The present invention, therefore, contemplates a simple and effective means of automatically changing the time significance of the holes in accordance with the direction of feed so that the net effect will be the same on the controlled apparatus as for the initial direction of feed.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a plan view of the card feeding and sensing mechanism.

Fig. 3 is a vertical section on line 3—3 of Fig. 1.

Fig. 4 is a vertical section showing the card lever and hopper contacts.

Figure 5A:
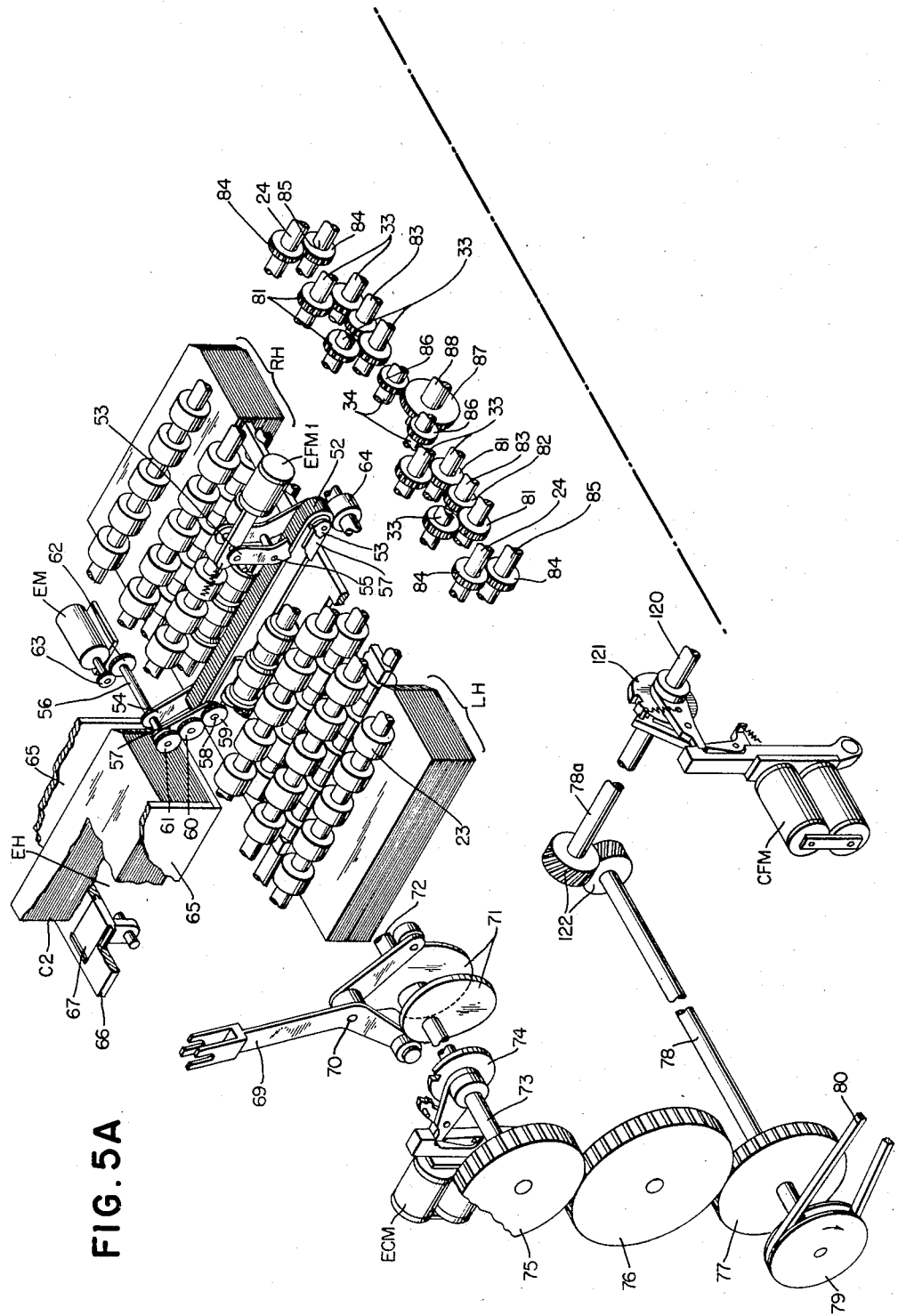
Figure 5B:
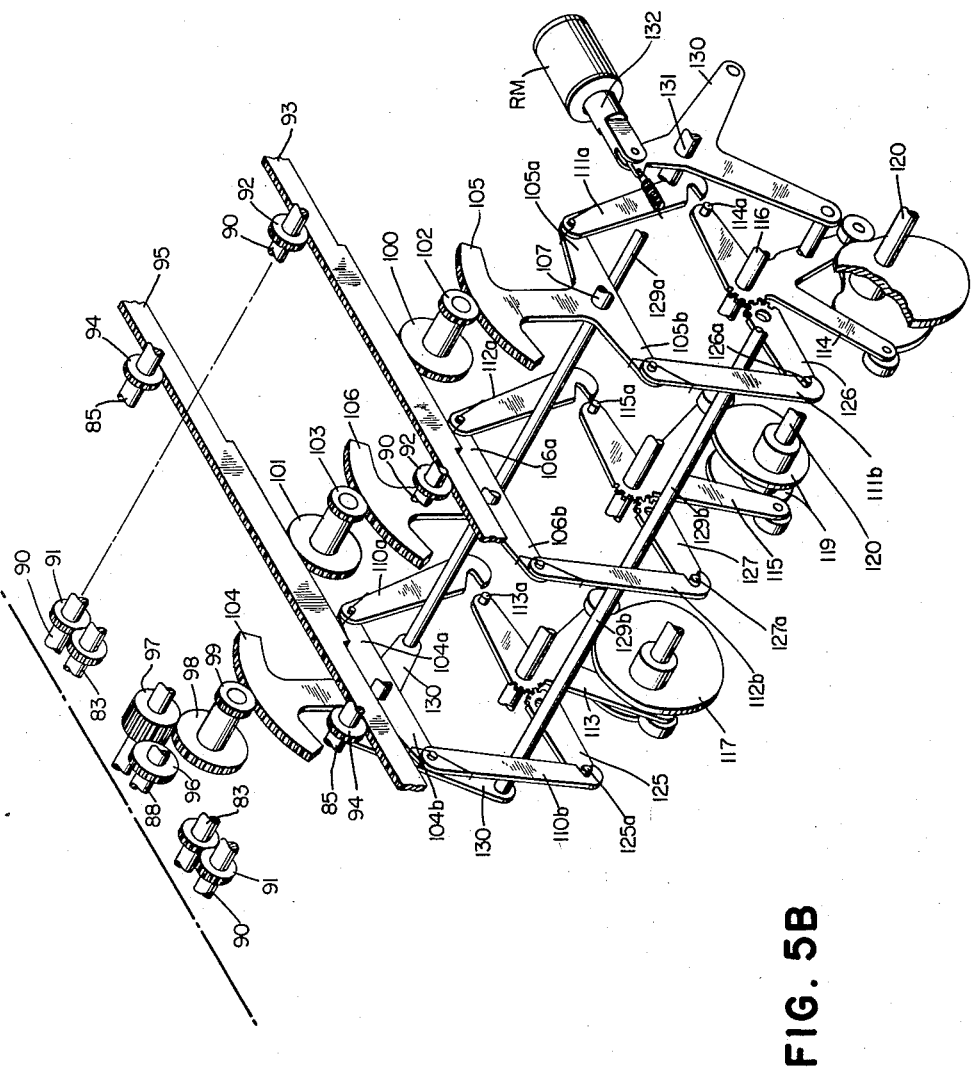
Figure 71:
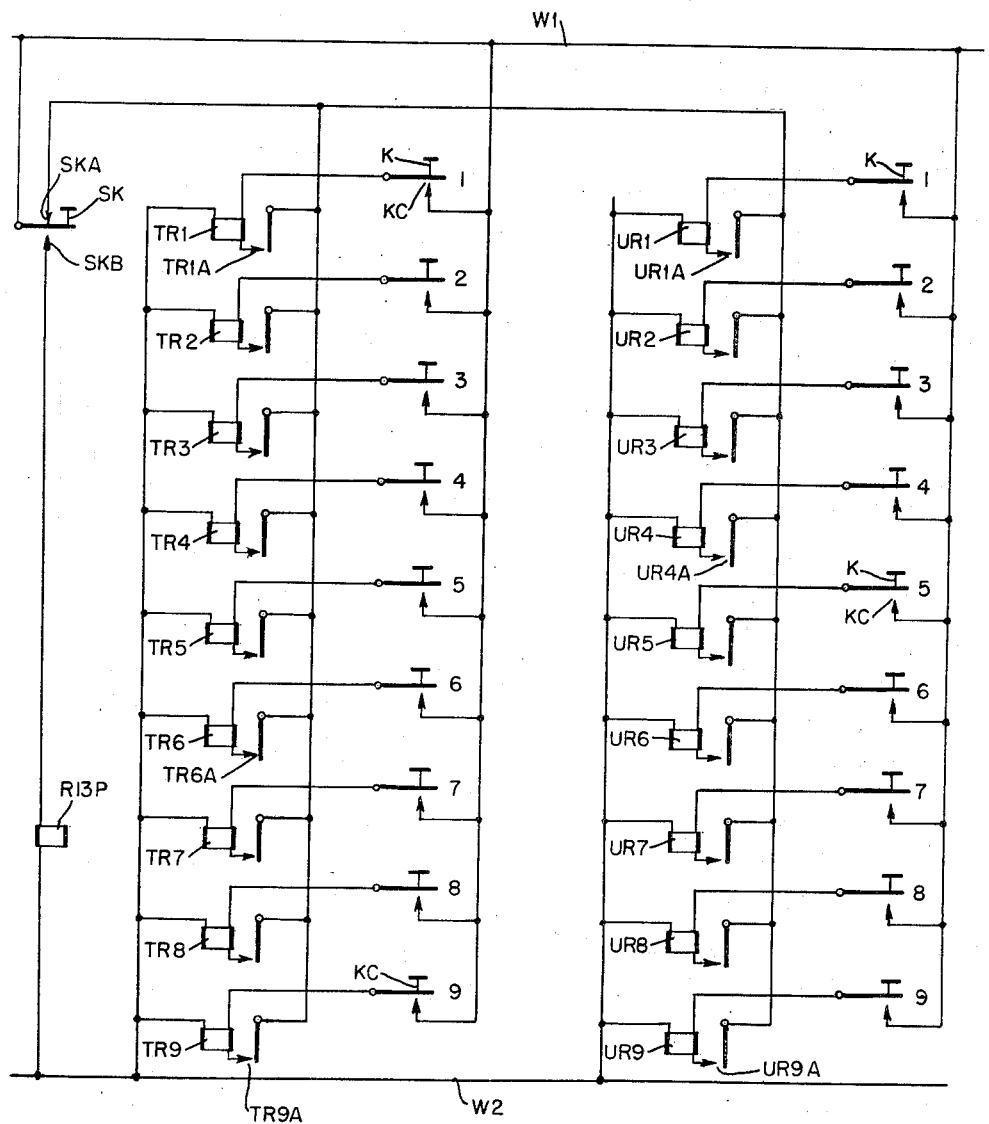

Figs. 5A and 5B together comprise a perspective view of the card feeding, inserting, and ejecting mechanisms.

Figure 6A:
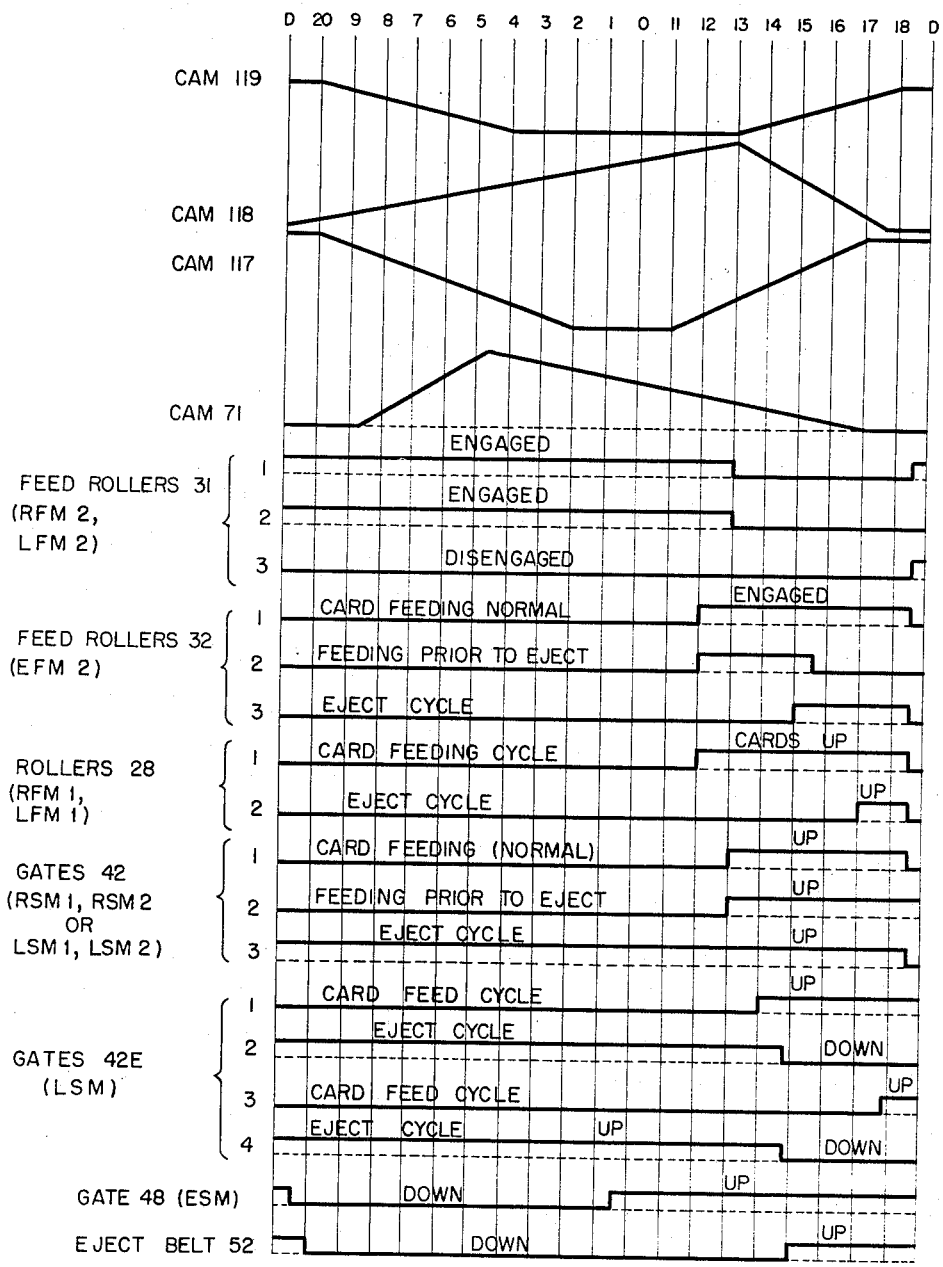
Figure 6:
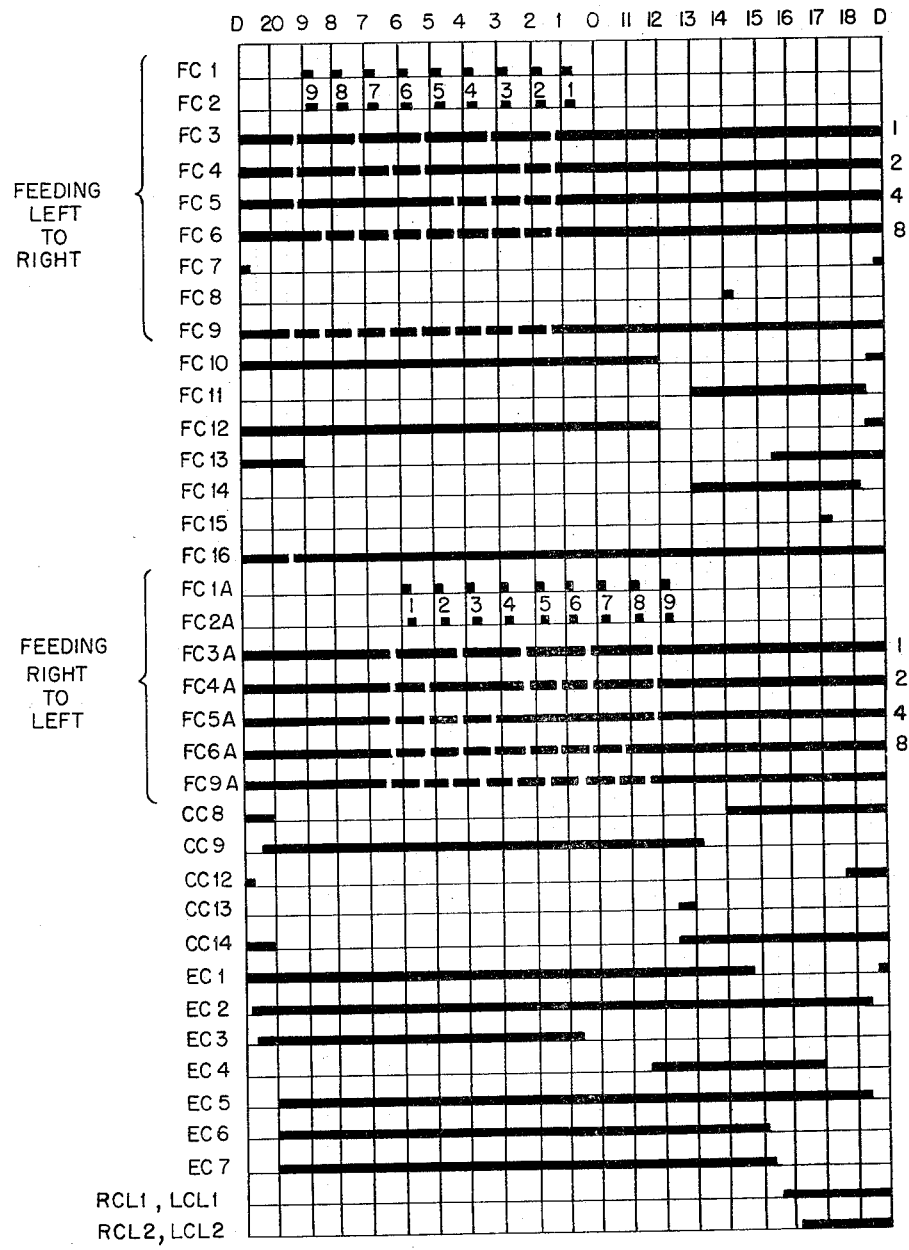

Figs. 6A and 6B comprise mechanical and electrical timing charts, respectively.

Figs. 7A and 7I comprise a wiring diagram.

Fig. 8 is a chart showing how the sheets comprising Figs. 7A to 7I arranged to form a wiring diagram and also indicate in a general way where the principal components of the wiring diagram, such as the register, are located.

The present invention contemplates the provision of mechanism for feeding a batch of record cards of conventional form in a single path between two card hoppers or pockets past two record sensing stations and a card inserting and ejecting station. This mechanism is supported by a pair of frame plates 10, 11 (Figs. 1, 2, and 3) which are joined in parallel by a number of cross-bars 13, 14 and 15 which form part of or support certain parts of the mechanism and by a horizontal plate 16 which also functions as a table or card guide over the top of which the cards are fed.

Figure 1:
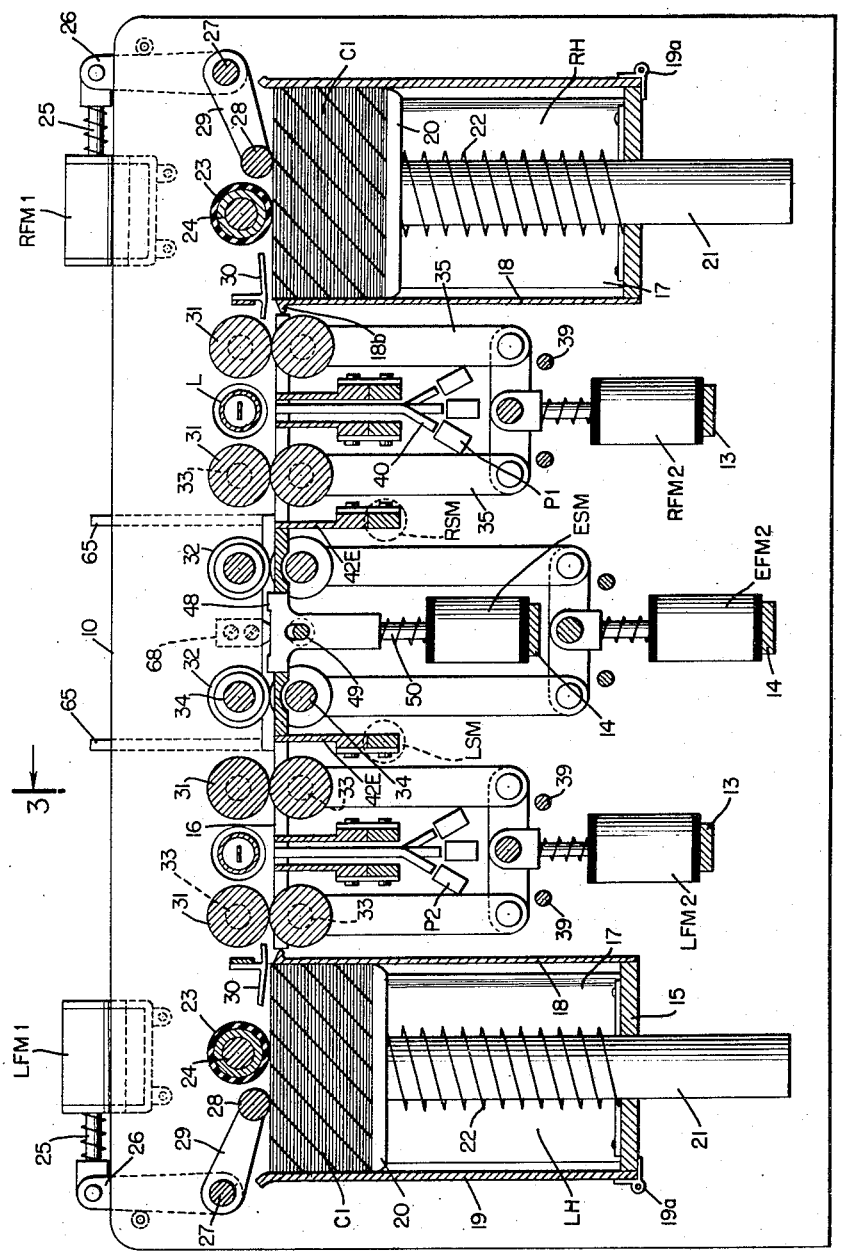
Fig. 1 is a vertical section through the card feeding and sensing mechanism.

Two of the cross-bars 15 form the bottoms of a right-hand card hopper RH (Figs. 1 and 2) and a left-hand card hopper LH. Secured to the top face of the cross-bars 15 are the side guide members 17 which serve as end walls for the hoppers RH, LH. One side wall of each hopper LH, RH comprises a plate 18 which is slightly movable vertically in guide blocks 18a (Fig. 2) carried by the plates 10, 11. The purpose of this slight movement will be made clear hereinafter. The remaining side wall of each hopper RH, LH consists of a plate 19 which is hinged at 19a to the cross-bar 15 and may be provided with a suitable latch or detent device to maintain it in a vertical position as shown in Fig. 1 to form a closed pocket or hopper, which is open only at the top, and into which the cards C1 are inserted. Vertically movable in the hoppers LH, RH are the card platforms 20, each mounted on the upper end of tube 21 suitably guided in a vertical bearing in the associated plate 15. The weight of the cards in each hopper LH, RH is counterbalanced by a spring 22 of sufficient tension to press the cards upwardly, even when the hopper is full, against a feed roller 23 carried by a shaft 24 journaled in the plates 10, 11.

Associated with each hopper RH, LH is a feed-controlling magnet or solenoid designated RFM1 in the case of hopper RH and LFM1 for the hopper LH. Each of the solenoids or magnets RFM1, LFM1 has a plunger 25 connected to an arm 26 secured to a shaft 27 journaled in the plates 10, 11, the magnets and the arms 26 being located behind the plate 10. Coacting with the top surface of the cards in each hopper LH, RH is a roller 28 which is journaled on arms 29 secured to the shaft 27. Whenever the magnet RFM1 or LFM1 is energized, the shaft 27 will be rocked clockwise and the roller 28 will push down the cards in the hopper a small amount for the purpose of preventing such cards from being ejected from the hopper by roller 23 and also to prevent interference with a card being fed into the hopper.

The upper edge of each plate 18 is beveled at 18b (Fig. 1) to act as a guide for a card being fed into the hopper, and the effect of the magnet LFM1 is to depress the stack of cards slightly below the beveled edge so that a card fed into the hopper will pass without interference to the roller 23. The beveled portion 18b is formed along the lower edge of a horizontal slot in the plate 18, which slot is in horizontal alignment with the top surface of the plate 16, the beveled part 18b being slightly below said surface to insure that a card will be guided into the hopper. Secured to the plate 18, near the center of the slot in plate 18, is a shoe 30 which serves the double function of throat block and card guide, the shoe being shaped in profile as shown in Fig. 1 to guide a card into or out of the hopper and the shoe is spaced such a distance from the upper edge of the beveled portion 18b that only one card at a time will be permitted to enter or leave the hopper.

The rollers 23 are driven in such fashion that either both rotate clockwise (Figs. 1 and 4) to eject a card from hopper RH and stack a card in hopper LH, or counter-clockwise to eject a card from hopper LH and stack it in hopper RH. The cards are transported along the top surface of the plate 16 by means of three sets of feed rollers which are located at two sensing stations and at a card ejecting and inserting station. There are two pairs of feed rollers designated 31 associated with each hopper LH or RH which receive a card ejected from the hopper and carry it past a sensing station located between the two pairs of feed rollers 31, and deliver such card to two pairs of feed rollers 32 located at the card ejecting and inserting station.

The feed rollers 31 are mounted on the shafts 33 (Figs. 1 to 4) and feed rollers 32 on the shafts 34. The upper shafts 33, 34 are journaled in fixed bearings carried by the plates 10, 11, but the lower shafts 33, 34 are mounted on arms 35 which are pivotally mounted on studs 35a carried by the plates 10, 11, so that the lower feed rollers 31, 32 may be disengaged to prevent feeding a card. For this purpose the shafts 33 for the lower feed rollers 31 are connected by links 35, as best shown in Fig. 3, to equalizer links 36 which are joined by a cross-rod 37. Pivoted at the center of the cross-rod 37 is the plunger 38 of a solenoid LFM2 for the left-hand side of the machine and RFM2 for the right-hand side of the machine. In other words, for each set of feed rollers 31 there is a set of the links 35, 36, shaft 37, and a solenoid LFM2 or RFM2. These will be termed the right feed magnet and left feed magnet, respectively, and are differentiated from the magnets RFM1 and LFM1 by the suffix "2."

The magnets RFM2, LFM2 may be secured to the cross-bars 13 (Fig. 1) at a point midway between the plates 10, 11. When a magnet such as RFM2 is energized, it pulls down the links 35 and disengages the lower feed rollers 31 of the set sufficiently to prevent them from gripping a card. When the magents are released, the links are pressed upwardly by the usual spring 38a provided in solenoid constructions to urge the plunger out of the core. In order to equalize the disengagement of the feed rollers in each set to insure that all will be disengaged, there are provided the stop rods 39 which are carried by the plates 10, 11. In similar fashion, a magnet EFM2 controls disengagement of the feed rollers 32.

Located between each of the pairs of feed rollers 31 (Fig. 1) is an electrooptical sensing device which, in the present case, consists of: a tubular light source L disposed parallel to the axes of the top pair of feed rollers 31, a series of light-conductive rods or flat bars 40, and a series of photosensitive devices such as miniature photocells or phototransistors P1 or P2. The lower ends of the rods 40 are bent to the right or left in alternation with straight rods to provide a staggered relationship permitting the suitable disposition of the relatively larger diameter photocells or phototransistors P.

The rods 40 may be preferably coated with an opaque material, except at the ends, to insure that there will be no interreflection of light from one rod to the other. The rods are approximately the same width as the columns of the card and are aligned in a row parallel with the feed rollers 31 so that, for each column in the card, there is a rod 40 and a photocell or phototransistor P. In order to provide a unitary, firm support for the rods and phototransistors, they may be molded in a suitable cross-bar of plastic which is secured to the plates 10, 11.

For the purpose of registering the cards fed from the hoppers RH, LH with the rows of photocells P1, P2 to insure an accurate sensing relation to the sensing means and to position the cards for ejection, there is provided a number of card stops or gates 42, 42E (Figs. 1 and 2), the detailed construction of which is best shown in Fig. 3. The card stop consists of a flat bar 42 or 42E which is vertically guided in slots 42a in the plate 16 at the upper right- and left-hand corners of the bar (Fig. 3). The latter is connected by links 44 to a sliding bar 45 which may be rectangular in cross section and guided in rectangular holes in the plates 10, 11. At one end the bar 45 is pivotally connected to the plunger 46 of a solenoid or stop magnet such as LSM2.

There are provided six of the stops or gates, four designated 42 and two designated 42E, and the respective magnets are designated RSM1, RSM2, LSM1, LSM2 (Fig. 2) in the case of the stops 42 located between the feed rollers 31; and RSM, LSM (Fig. 1) in the case of the stops 42E located between related pairs of feed rollers 31, 32. The magnets LSM1, LSM2 are energized to effect card registration when the cards are feeding from right to left, that is, for leftward feeding of the cards; and the magnets RSM1, RSM2 are similarly energized for right-ward feeding of the cards. The magnets RSM, LSM are operated in a succession in accordance with the direction of feed when a card is inserted or ejected from the eject station and are primarily for the purpose of aligning the card to be ejected.

For the purpose of aligning an inserted card at the eject station, there is provided a card stop or gate 48 which is vertically guided by one of the studs 35a and also by the edge of plate 16, as best shown in Fig. 2. The card stop 48 is located so that its near face cooperates with and guides cards fed from right to left or from left to right, and for that reason the edges are beveled, as shown in 48a in Fig. 2, to keep them from catching on the cards. The card stop 48 is connected at its lower end to the plungers 50 (Fig. 1) of eject stop magnet ESM and normally is held up by the usual solenoid retracting spring.

When it is desired to remove a card at the eject station, the magnet ESM is energized to pull down stop 48 and permit the card to be pushed outwardly transversely of the normal line of feed through a suitable slot in the frame 11. Since such a card would normally under the anticipated conditions of operation be considered a replacement card of possibly no future value, no provision has been made for further transport of the card. It is understood, however, that, if necessary, additional feed rollers could be provided for the purpose of conveying the ejected card to some other piece of apparatus for the purpose of utilization of data on the card in some useful way.

For the purpose of ejecting a card in the eject station, there is provided an eject mechanism which is best shown in Figs. 4 and 5A. This mechanism consists of a flexible belt 52 which is supported on suitable pulleys carried by the duplex lever arms 53, 54, each of which consists of a pair of similar levers suitably joined together in spaced relation with the pulleys and the belt 52 therebetween. The lever 53 is pivotally mounted on a suitable stud 55 carried by a fixed part of the framework and the lever 54 is similarly mounted on a drive shaft 56. The pivots for the pulleys carrying the belt 52 are interconnected by a link 57 which, with levers 53, 54, forms a parallel motion linkage whereby the rocking of lever 53 clockwise in Fig. 5A likewise causes lever 54 to rock in the same direction, thus pressing the belt 52 downwardly against a card lying on the top of the plate 16 at the eject station.

The pulley associated with lever 54 is fixed to a shaft 58 (Fig. 5A) carrying gear 59 meshing with an idler gear 60 on a suitable pivot carried by the lever 54. The shaft 56 carries a drive gear 61 meshing with gear 60 and a driven gear 62 which meshes with a pinion 63 on the shaft of the eject motor EM. Pivotally connected to the lever 53 is an eject feed solenoid or magnet EFM1. When the magnet EFM1 is energized, the belt is pressed downwardly in contact with the card and with an idler feed roller 64 journaled on a suitable bracket carried by the plate 11.

The rear plate 10 is provided with a suitable horizontal slot aligned with the top surface of the plate 16 between two vertical frame plates 65 (Figs. 1, 2, and 5A) which form the sides of an eject card hopper EH of conventional form containing the cards C2. The bottom of the hopper comprises a horizontal plate 66 which is formed with suitable guides for a conventional card picker 67. The hopper EH is provided with a throat knife 68 (Fig. 1) and a throat block (not shown) of conventional form which permits only one card at a time to be ejected from the eject hopper EH by the picker 67.

The picker 67 is actuated by a cam follower lever 69 (Fig. 5A) pivoted at 70 to a fixed part of the framework and coacting with a pair of complementary cams 71 carried by a shaft 72 suitably journaled on the back plate 10. The shaft 72 may be coupled to a drive shaft 73 by means of a conventional one-revolution clutch 74 which is controlled by the eject clutch magnet ECM. When magnet ECM is energized, the picker mechanism will be rendered effective to eject a card from hopper EH. The shaft 73 is driven by a train of gears 75, 76, 77 of which the latter is mounted on the main drive shaft 78 of the machine. This shaft is driven by a suitable motor M (Fig. 7A), not shown, through a pulley 79 and a belt 80.

The various feed rollers 23, 31, 32 are driven by a mechanism which is most clearly shown in Figs. 2, 5A, and 5B and supported by the plate 11 and a front plate 11A. The shafts 33 are intercoupled by the gears 81 of which the lower gears mesh with gears 82 carried by the shafts 83. The shafts 24 are intercoupled by pinions 84 to the shafts 85. The lower shafts 34 are provided with the pinions 86 which mesh with gear 87 on a shaft 88.

The mechanism for driving the shafts 83, 85, 88 is shown in Figs. 2 and 5B. The shafts 83 are coupled to the shafts 90 by means of the pinions 91 which shafts are provided with the pinions 92 meshing with a rack 93 suitably guided for horizontal movement in the framework. The shafts 85 similarly are provided with pinions 94 which mesh with a rack 95. Shaft 88 carries a pinion 96 meshing with an idler pinion 97 which in turn meshes with a gear 98 to the hub of which is secured the pinion 99. The racks 93, 95 mesh with the gears 100, 101, respectively, which are fixed to the pinions 102, 103.

The pinions 100, 102, and 103 mesh with gear sectors 104, 105, 106 (Fig. 5B) which are pivotally mounted on a cross-rod 107 carried by the framework. Each of the sectors 104, 105, 106 has a pair of arms extending horizontally at opposite directions which are designated 104a, 104b, 105a, 105b, 106a, 106b, respectively. Pivoted on the arms 104a, 105a 106a are the coupling hooks or links 110a, 111a, 112a, respectively, and the arms 104b, 105b, 106b are similarly provided with the links 110b, 111b, 112b. These links are hook-shaped at their lower ends and links 110a, 111a, 112a cooperate with pins 113a, 114a, 115a carried by the arms of cam follower levers 113, 114, 115 which are pivoted on the rod 116 fixedly mounted in the framework. The cam follower levers 113, 114, 115 are actuated by the pairs of complementary cams 117, 118, 119 carried by the card feed shaft 120.

The shaft 120 is coupled by a conventional one-revolution clutch 121 (Fig. 5A) similar to the clutch 74, to the shaft 78a which is driven by the main drive shaft 78 through a pair of spiral pinions 122.

The cam follower levers 113, 114, 115 are formed with gear teeth adjacent their hubs which mesh with similar gear teeth carried by the arms 125, 126, 127 pivoted on a cross-rod carried by the framework. The arms 125, 126, 127 are provided with pins 125a, 126a, 127a similar to the pins 113a, 114a, 115a which coact with links 110b, 111b, 112b. Normally one or the other of the sets of coupling hooks or links 110a, 111a, 112a and 110b, 111b, 112b are connected to the pins 113a, 114a, 115a and 125a, 126a, 127a for the purpose of driving the sectors 104, 105, 106 in one direction or the other, according to which group of links is coupled to a set of pins on either the cam follower levers 113, 114, 115 or arms 125, 126, 127.

The links 110a, 110b, etc. are operated in unison to connect and disconnect them from the pins by means of the rods 129a, 129b (Fig. 5B) supported by the arms of a pair of bifurcated levers 130 secured to a cross-shaft 131 journaled in the framework. One of the levers 130 is pivotally connected to the plunger 132 of the reversing solenoid or magnet RM.

As shown in Fig. 5B, the links 110b, 111b, 112b are operatively coupled to the pins 125a, 126a, 127a whereby the rotation of shaft 120 will cause the sectors 104, 105, 106 to be rocked according to the shape of the cams to thereby actuate the racks 93, 95 and the large gear 98 in the desired direction in a manner which will be made clear hereinafter when the clutch 121 is engaged by the energization of the card feed magnet CFM (Fig. 5A).

The machine is provided with suitable card lever contacts and hopper contacts which are rendered operative when the cards are exhausted from the hoppers RH, LH. The card platforms 20 (Fig. 3) are formed with a shallow notch 20a with which coacts a contact operating lever 135 pivoted at 19b on a bracket 19c carried by the plate 19. The horizontal arms of the lever 135 is designed to enter the recess 20a when the last card is fed from the hopper. The lever 135 is spring urged in a direction to cause the vertical arm of the lever 135 to move outwardly away from the plate 19 and permit the contacts RHC, in the case of hopper RH, and LHC in the case of hopper LH, to open. However, as long as cards remain in the magazine, the levers 135 will be rocked slightly on their pivots 19b as shown at the left in Fig. 3 to close the associated contacts LHC or RHC. When a card is fed from either magazine, it cams upwardly members 136, which are vertically guided by the shafts 33, to the position shown in Fig. 3. Each member 136 is connected to one of the contact members of card lever contacts RCL1, RCL2, LCL1, LCL2 to close these contacts whenever the member 136 is lifted by the card. Each member 136 is formed in a semicircular shape at its lower end so that it will be actuated by a card fed in either direction. Whenever a gap occurs in the feeding of the cards, the spring tension of the associated contact member and the weight of the member 136 causes it to drop downwardly, as shown in Fig. 3 in the case of contacts RCL2, to open said contacts. The contacts RCL1, RCL2, etc., may be mounted on suitable cross bars 14a carried by the plates 10, 11.

The present invention contemplates the successive sensing of cards fed from one or the other of the hoppers RH, LH until data representing the address indicia agrees with data designations or address indicia sensed in the cards. Thereafter, the data which the address indicia represents or identifies on the selected card may be entered into a register for the purpose of further utilization of the data in some manner, as in electronic calculating operation of some kind. For example, the data recorded in the cards might be a table of logarithms which are identified by the antilogarithms which could be represented in the cards by means of perforations, and the logarithms might be employed in a calculation of some kind.

The invention contemplates the use of two electronic registers with an electronic means of cross-comparing the data entered in the registers, order by order, for the purpose of determining when a card having sought-for data is sensed. For this purpose the record cards will be sensed at one of the stations and the address or search indicia entered in one of the registers, while in the other register the address or search indicia for the sought-for data will be entered by some convenient means which, illustratively in the present case, may consist of a suitable keyboard.

For convenience in illustrating the invention, it has been disclosed as having a pair of electronic registers and comparing means such as are disclosed in application Serial No. 479,019, filed December 31, 1954, by A. H. Dickinson. The registers disclosed in the above application are a conventional modified binary decimal type involving four binary stages for each denominational order which represent the binary bit values 1, 2, 4, 8.

Figs. 7F, 7G, and 7H disclose partly in block form two-order registers of the modified binary decimal type disclosed in aforesaid application with the usual blocking tubes omitted for sake of compactness. In the present case register A is utilized to store the address data which is sensed in the card, while register B has entered therein, by means of the keyboard, the address of the data which is to be searched. Only the details of the tens order stages ST8 and the comparing circuits associated therewith are shown at the left in Fig. 7G, the remaining circuits being shown in block form.

The keyboard is shown in Fig. 7I and includes two banks of digital keys K which operate the digital contacts KC. The digital values of the keys are indicated by the small numbers 1 to 9 adjacent the keys. When a key is depressed, it closes the contacts KC and energizes a related one of the relays UR1 to UR9 in the case of the units order, and TR1 to TR9 in the tens order. The affected relays close the contacts UR1A to UR9A, thereby establishing a holding circuit between the line wires W1, W2 through the normally closed contacts SKA of the start key SK.

The relays UR1 to UR9 and TR1 to TR9 operate contacts designated UR1B to UR9B and TR1B to TR9B in Figs. 7F, 7G, and 7H which are inserted in series in various combinations between the right-hand grid bias resistors (terminals E) of the trigger stages for register B and the grid bias wire W3. The effect of the opening of these contacts in various combinations is to turn on the trigger stages ST1, ST2, ST4, ST8 according to the combinations of binary bit values needed to represent any given digit. For example, with reference to stage ST8 of register B for the tens order, the contacts TR8B, TR9B are normally closed and connect the right-hand grid resistor for stage ST8, block terminal E, to the negative bias wire W3.

If the "8" key or the "9" key in the tens order (Fig. 7I) were depressed, one of the contacts TR8B or TR9B (Fig. 7G), as the case may be, will be opened, and by disconnecting the right-hand grid from the bias wire W3 will cause stage ST8 to be triggered on to represent either the value "8" if the 8 key had been depressed or the bit value "8" if the 9 key had been depressed. For the same order, it will be noted in Fig. 7F that stage ST1 also has contacts designated TR9B which will be operative whenever the 9 key is depressed to additionally turn on stage ST1 for the tens order.

In other words, the effect of depressing any digital key is to cause the various "B" contacts of the relays UR1 to UR9 or TR1 to TR9 to open and turn on stages ST1, ST2, ST4, ST8 in combinations according to the bit values which are involved in the digital value to be entered in the respective order of the register.

When the start key SK (Fig. 7I) is depressed, the contacts SKA will be opened, breaking the holding circuits for the operated relays UR1 to UR9 and TR1 to TR9. As will be seen later, the depression of the start key SK also starts the searching operation.

The values in the registers are compared by means of circuits similar to those disclosed in the above application and will only be very briefly described herein. Let it be assumed that identical entries have been made in the registers as a consequence of a card being sensed which has the same address indicia as was entered in register B by means of the keyboard. This means that both stages ST8 for the tens order and both stages ST1 of the units order (Fig. 7G) will either be on or off. Since, for the time being, only the quality condition is of interest, let it be assumed that both stages ST8 are on in Fig. 7G. The transistors T2 in Fig. 7G will both be conducting a maximum, thereby raising the potentials of the grids of tubes V2 and V4 causing these tubes to conduct. This cuts off both triodes of the tube V3 causing the anode potentials to rise and raise the potential of the suppressor grid of gate V5 to prime this gate for conduction.

Once during each cycle of the machine a positive pulse is applied over wire W26 (Fig. 7G) to the control grid of tube V5 causing this tube to conduct. This produces a negative pulse which is applied to the grid of tube V6 momentarily cutting off this tube and producing a positive pulse which is applied over wire W20, as described in the above application to the control grid of stage ST4 (Fig. 7F) of the tens order. Since the values in the register are assumed to be equal, the process will be repeated for the stages ST4, ST2, ST1 of the tens order and, in the manner described in the above application, a test pulse will be injected into stage ST8 of the units order and passed on in the same manner to units order stage ST1 thereby producing a negative pulse on wire W7. This negative pulse is operative to cut off tube V10 (Fig. 7C) and produce a positive pulse which renders the tube V11 conductive. The tube V11 is a power tube of some kind, such as a gas tube or thyratron, which controls the equal relay R19.

If the value in register A is greater than the value in register B, one of the gates V9 will be rendered conductive, in the manner described in the aforesaid application, and produce a negative pulse on wire W9 which cuts off tube V12. This, provided the switch S1 (Fig.

7C) is closed, will cause the gas tube V13 to conduct, energizing high relay R29. The gate V9 is similar to the correspondingly designated gate in the above application, except that, in the present case, the second triode is eliminated and the control is effective only upon the equal and register A high conditions. Tubes V11, V12 have the same functions as the correspondingly designated trigger tubes in the associated application and are controlled in exactly the same way by the comparative states of the corresponding triggers in the two registers. Since the action of the comparing circuits involving the tubes V2 to V9 is fully described in the above application, the operation of these circuits will not be described further in detail herein. It will be sufficient to remember that when register A contains a value higher than register B, tube V13 is rendered conductive; and when the values are equal, tube V11 is rendered conductive. The effects produced by the equal relay R19 and the high relay R29 will be described in detail hereinafter at the appropriate points.

There is a photocell P1 or P2 (Fig. 7E) for each column on the cards which have eighty columns in the most commonly used form of card. The cathodes of the photocells P2 are connected alternately to the input condensers for amplifiers V22 and the cathodes of photocells P1 are similarly connected alternately to the input condensers for the amplifiers, the small numbers in Fig. 7E denoting the card columns. The registers are used initially for the purpose of searching for a particular card by comparing the address indicia or designations on the card entered in register A wtih predetermined address indicia in register B by means of the keyboard. Since the operation of the machine contemplates the feeding of cards in either direction, the significance of the perforations in the card with reference to the leading edge of the card will be changed due to the changed order of sensing of the index point positions when the feeding of the card is reversed. For this reason it is not possible to directly connect the photocells to register A through a suitable read-in or entry circuit.

Figure 7E:
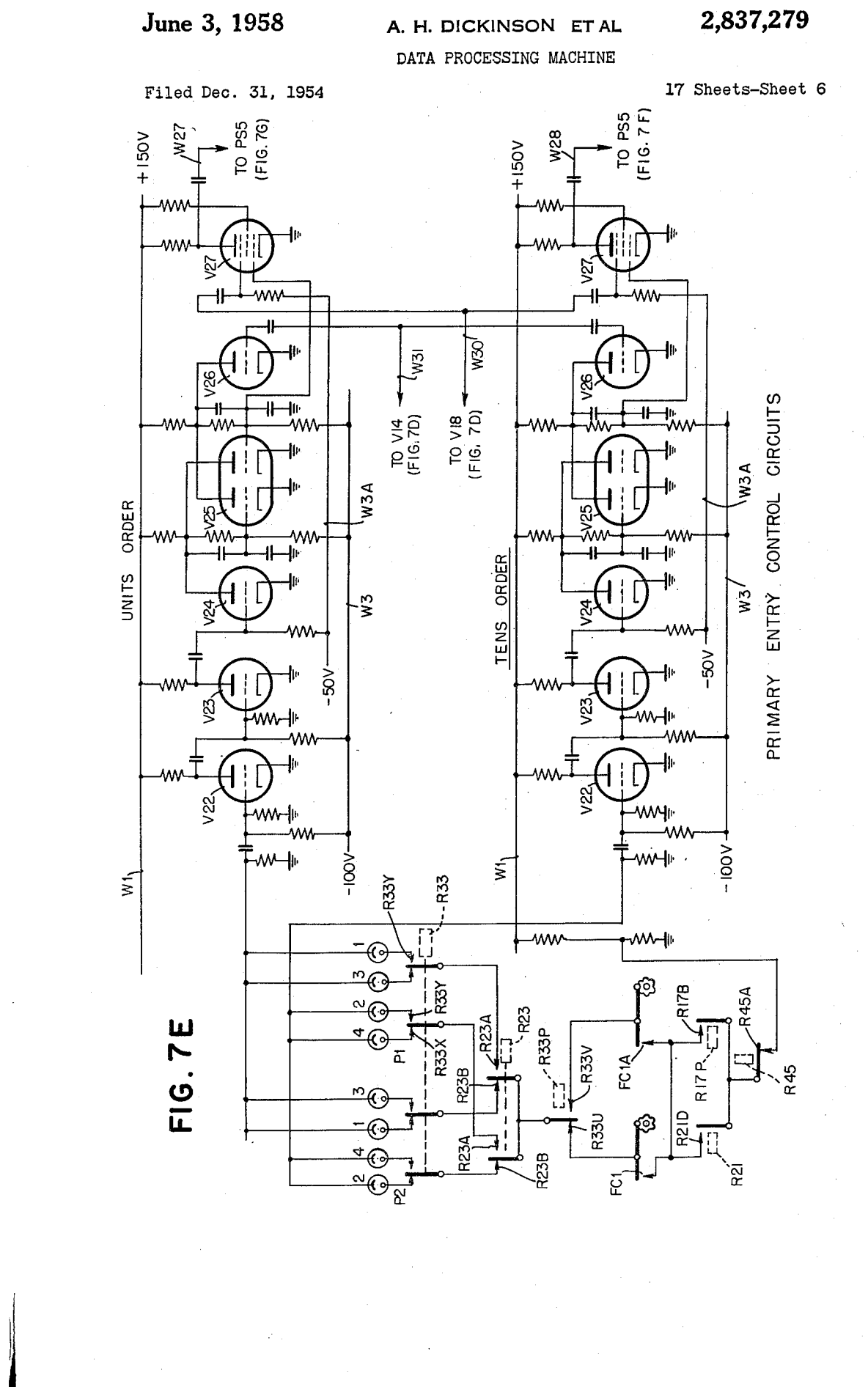

The circuits which control the entries in register A according to the direction in which the cards are feeding are shown in Figs. 7D and 7E. Associated with each order of register A is a primary entry control circuit which is shown in Fig. 7E. This circuit comprises the tubes designated V22 to V27 and the circuits are identical for the two orders. Common to all of the primary entry control circuits is a secondary entry control means which includes a master oscillator or multivibrator MV, including the tube V15 (Fig. 7D) and a circuit group of associated tubes designated V16 to V21. This circuit group in turn is controlled by a pulse timing counter in the form of a conventional four-stage binary counter, the function of which is to relate the values of the address designations and the sought-for data designations to the direction of feed in such fashion that the entries in the register will always correspond to the actual significance of the designations regardless of the direction of feed.

The multivibrator MV (Fig. 7D) is free-running and its output is applied to the inverter and amplifier V16, positive pulses from which are supplied to the suppressor grid of the gate V17. This gate is directly controlled by a conventional trigger V20 which is normally off, as indicated by the small letter "x," with the left-hand triode conductive. The control grid of the gate V17 is connected to the right-hand grid of V20 and, when this trigger is turned on, the elevated potential of the right-hand grid will prime the gate V17 for conduction at the control grid. The trigger V20 is turned off once for each index point position or cycle point and is turned on by the timing contacts FC2 or FC2A according to whether the direction control relay R33P is energized or deenergized.

The machine is equipped with certain timing contacts which are arranged in three groups. The first group, contacts CC8, CC9, and CC12 to CC14, may be driven by cams actuated by shaft 78 (Fig. 5A) so as to periodically close while the motor M is in operation. The second group, contacts FC1 to FC16, FC1A to FC6A, and FC9 may be driven by shaft 120 and operate only while cards are feeding. The third group, contacts EC1 to EC7 may be driven by shaft 72 and are operative only during card inserting and ejecting cycles. The prefix letters C, F, and E signify "continually" running, "feeding" cards, and "ejecting" cards, respectively, for conveniently remembering the times of operation of contacts so identified.

For convenience in description, it will be assumed for the moment that normally cards always feed from left to right and that under these conditions the relay R33P is deenergized connecting the contacts FC2 to the wire W1. It will be noted in Fig. 6B that the contacts FC2 close momentarily for each of the index-point positions 1 to 9 on the card. The cards are normally placed in the hoppers face up with the "9" index point positions at the right (Fig. 1). Thus, for feeding from left to right or rightward feeding as it may be termed hereinafter, the index-point positions will be sensed in the most usual order 9, 8, 7 * * * 2, 1. Each time the contacts FC2 close, the tube B19 is rendered conductive and will produce a negative pulse which will be applied to the left-hand grid of trigger V20 turning this trigger on. This will render the gate V17 in response to the pulses of multivibrator MV, periodically conductive and will produce negative pulses which are applied to the grids of the tube V14 for stage ST1 of the counter.

The initial pulse turns on or off the first stage ST1 of the counter according to its status and also produces a negative pulse from one of the anodes of tube V14 which is applied to either the suppressor grid or control grid of tube V18. Tube V18 is normally conductive and may be rendered periodically nonconductive by negative pulses appearing on either the suppressor grid or the control grid. Thus a positive pulse is produced on the anode of tube V18 for each negative pulse applied to counter stage ST1 which is applied by way of wire W39 to the suppressor grids of tubes V27 (Fig. 7E). If the control grids of either of the tubes V27 are made positive at this time, the positive pulses appearing on wire W30 will render the tube or tubes V27 conductive and produce negative entry pulses which are applied over wires W27, W28, as the case may be, to enter digits in the appropriate orders of register A. The triggers V25 (Fig. 7E) determine whether or not negative entry pulses will appear on the wires W27, W28 and this in turn will depend upon whether a photocell P1 or P2, according to the direction of feed, senses a perforation in the card.

The counter in Fig. 7D, prior to sensing each index-point position, is preset to a predetermined value related to the digital value of the index-point position which is about to be sensed by the photocells, and the circuits are arranged so that the counter always will be restored to zero under control of the negative pulses from the multivibrator MV according to the number of pulses required by the digital value of the index-point positions sensed.

The entry of a digital value in register A is completed during the period in which the index-point position of the same value containing a perforation is sensed. In other words, if a "9" perforation is sensed while the cards are feeding from left to right or rightwardly, nine pulses will be entered in the register before the "8" index-point position is sensed.

At the "9" index-point positions when feeding rightwardly, the counter in Fig. 7D is automatically preset to "7" through the operation of the contacts FC3, FC4, FC5. It will be noted in Fig. 6B that just before the "9" index-point position or cycle point, according to the scale at the top, contacts FC3, FC4, FC5 open momentarily. This removes the bias from the right-hand grids of stages ST1, ST2, ST4 of the pulse timing counter and automatically sets the counter to the value "7" represented by the combination of the binary bit values 1, 2, 4. This action takes place before the contacts FC2 close to cause the entry of the initial impulse into the stage ST1 as described above. As a result, assuming the presence of a "9" hole, a series of nine pulses will be applied to the stage ST1 of the counter which, added to the value 7, will cause the counter to be restored to zero, the counter operating in a conventional manner and producing a positive output pulse on the wire W31 each time it reaches the count of 16. This renders the tubes V21, V26 conductive and has the effect of turning off the triggers V20, V25, thus limiting to nine the entry of negative pulses in register A.

Let it be assumed for the moment that there is recorded the value "9" in a column sensed by the units order photocell P2. The contacts FC1 (Fig. 7E) close momentarily slightly before the contacts FC2 close at the "9" index-point position. Since there is a hole at "9," the units photocell P2 for column 1 will be rendered conductive and cause current to flow from line wire W1, through the contacts R45A, R17B, FC1, R33U, R23B, R33X, photocell P2 for column 1, and the input resistor of units order amplifier tube V22, to ground (wire W2).

Due to the input condenser a positive pulse will be applied through the input condenser to amplifier V22 (Fig. 7E) in the units order, causing it to conduct. A negative pulse thus appears on the anode of tube V22 which renders the V23 tube nonconductive. This in turn renders tube V24 conductive, forcibly turning trigger V25 on. When trigger V25 is turned on, the potential of its right-hand grid rises and, as was explained above, primes the entry gate V27 of the units order for conduction. During the period in which the photocells P2 are sensing the "9" index-point positions of the first card, the pulse timing counter in Fig. 7D is being pulsed and restored to zero in the manner described above by nine negative pulses. The alternate turning on and off of the stage ST1 by these pulses causes the tube V18 to be cut off periodically producing a positive pulse on wire W30 for each negative pulse applied to stage ST1 of the counter and this similarly periodically causes the units order gate V27 (Fig. 7E) to conduct. Thus, nine negative pulses will be applied over wire W27 to stage ST1 of the units order of register A to enter the value "9" in the register.

When the pulse timing counter (Fig. 7D) is restored to zero by the "9" pulses, as described above, turning stage ST8 off, a positive pulse appearing on wire W31 forcibly turns off the units order trigger V25 by rendering tube V26 conductive and prevents the application of further negative pulses to the units order of register A. The forcible turning off of trigger V20 due to conduction of tube V21 under control of the positive pulse on wire W31 also renders the gate V17 nonconductive and prevents any more pulses from the multivibrator MV from being applied to the stage ST1 of the timing counter. Thus, in the time space of less than required to sense one index-point position at "9" in the cycle, the value "9" will be entered in the units order of register A.

At each index-point position, one or more of the contacts FC3 to FC6 (Fig. 6B) will open momentarily to preset the timing counter (Fig. 7D) to the value of the index-point position subtracted from sixteen. Thus, at "1," for example, the value fifteen will be entered in the counter. It will be noted in Fig. 6B that just prior to the closure of contacts FC1 at "1," all of the contacts FC3 to FC6 open momentarily and turn on all of the stages of the timing counter, which has the effect of entering "15." Thus, if there is a "1" hole in the card when contacts FC2 close, only one pulse will be applied through the gate V17 to the stage ST1 of the counter and will have the effect of turning off all stages of the counter and at the same time a single pulse will be applied over wire W30 to the appropriate gate V27 and allow only a single negative pulse to be applied to the stage ST1 of the affected order of the register.

When the direction of feed of cards is reversed, the relay R33P is energized and, it will be noted, switches the control from the contacts FC2 to contacts FC2A, renders the photocells P1 operative, and renders contacts F1A effective. In this case contacts F3A to F6A are also rendered effective to invert and retime the presetting of the timing counter for each sensed index-point position. In this case the cards are being fed leftwardly and, if a card is punched "9," it will be sensed at "12" in the cycle, not only because of the fact that the order of the index-point positions is reversed, but because three additional index positions, the "12," "11," and "0" positions on the card, must be sensed before the "1" index-point position. In other words, with reversed feeding of the cards the "1" index-point position for leftward feed will be sensed at approximately the same time as the "6" index-point position is sensed for rightward feeding.

Now let it be assumed that a card is punched "1." At just before "6" in the cycle of contacts FC3A, FC4A, FC5A, FC6A open momentarily and preset the timing counter to the value "15" by turning on all stages ST1, ST2, ST4, ST8. Immediately thereafter the photocell P1 will sense the "1" perforation in the card and cause the counter to turn to zero. The gates V17 and V27 and tube V18 function as described above to limit the entry to a single pulse in the appropriate order to register A.

The foregoing operations may be summed up briefly as follows: Just prior to the sensing of each index-point position by the photocells, the timing counter is preset under control of the contacts FC3 to FC6, or FC3A to FC6A, according to whether the card is feeding to right or left, to enter the value which is equal to the difference between sixteen and the value of the index-point position sensed. Thereafter the sensing of the perforation causes the initiation of a sequence of register entry pulses under the control of the timing counter which causes the proper value to be entered in the register, these entries being selectively controlled with respect to the different orders by the photocells for the different orders. The actual entry of pulses into the register and the timing counter at each index-point position at which there is a perforation is initiated by the closure of the contacts FC2 or FC2A and is terminated by the counter reaching zero.

The general operation of the machine under two different conditions will now be described in detail. For the first condition it will be assumed that there is provided a file of cards which are arranged in serial order according to sequence designations which, according to common terminology in the art, may be considered as address indicia in that they identify the position in the file of records at which certain desired data recorded in a particular card may be located. The file of cards will be placed face up in the left-hand hopper LH (Fig. 1) with the "9" index-point positions at the right and the card lowest in sequence at the top. Next, reset key RK (Fig. 7F) is operated to disconnect the left-hand grids (terminals B) of the triggers of register B from the bias wire W14B, thereby turning off any triggers which may be on. Next the address data or indicia is entered in register B by means of the keyboard (Fig. 7I) in the manner described above which causes the various stages of register B to be turned on in accordance with the bit values involved in the digits of the address. In the present case it is assumed that the cards are in numerical sequence; therefore, the random switch S1 (Fig. 7C) will be closed. It will be assumed that the data on the selected card is to be used in some fashion in other equipment as, for example, an electronic calculator or data processing machine and, accordingly, the eject switch S2 will be left open.

Figure 7C:
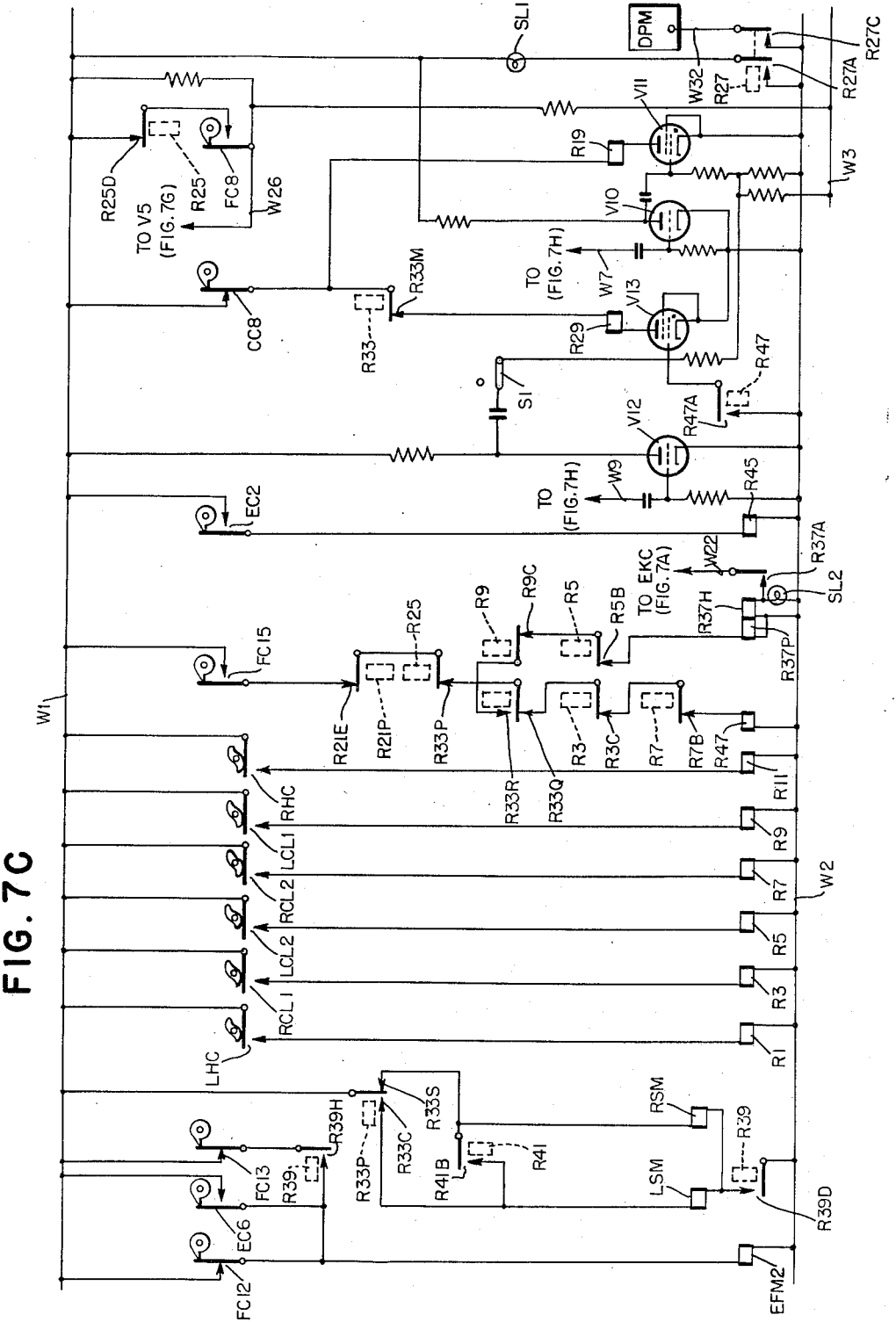

The machine is started in operation by depressing the start key SK (Fig. 7I). This causes the opening of the holding circuits for the relays UR1 to UR9 and TR1 to TR9 and also closes a circuit from the line wire W1, through contacts SKB and the relay R13P, to line wire W2. The contacts R13A (Fig. 7A) close and establish a holding circuit for relay R13P through its hold coil R13H, which circuit is maintained through the contacts R27B of relay R27. Contacts R13B close and start both the eject motor EM and the main driving motor M. Since there are cards only in the left-hand hopper LH, only the contacts LHC (Fig. 7C) are now closed and contacts RHC open. Under these conditions only the relay R1 is energized.

The contacts designated CC8, CC9, CC12, CC13, CC14 (Fig. 6A), are now in operation. Contacts CC13 (Fig. 7A) close during the first idle cycle of the machine and energize relay R15P through contacts FC7 and R13C.

Contacts R15A close and establish a holding circuit for the hold coil R15H of relay R15 (Fig. 7A) through the contacts R37B, contacts EKC of the error key EK, and contacts R27B. Thereafter contacts CC12 close and establish a circuit from line wire W1, through contacts R15B, R29B, R25B, R1A, and card feed magnet CFM to line wire W2. The shaft 120 (Fig. 5A) is coupled to shaft 121 at the end of the first idle cycle and drives the cams 117, 118, 119. The reverse magnet RM and reverse relay R33P have not been energized; consequently, the links 110b, 111b, 112b remained hooked to the pins 125a, 126a, 127a. As a result, the rocking of the cam followers 113, 114, 115 will draw down the links at appropriate times determined by the timing of the cams and rock the sectors 104, 105, 106 in a counterclockwise direction. Since a cycle is required to eject the first card from the magazine, the first part of the first full card feeding cycle is mainly for the purpose of initially positioning the racks 93, 95, and the sector 104 for the subsequent ejection of the first card into sensing position, which will take place near the end of the first cycle when the sectors 104, 105, 106 reverse their direction of movement.

Near the end of the first card feeding cycle the rack 95 will be drawn to the left (Figs. 2 and 5B) and rotate the shaft 85 clockwise (Fig. 5B). This rotates the left-hand feed roller 23 in a counterclockwise direction (Fig. 1) and causes the first card to be carried to the right into a position to be gripped by the first pair of feed rollers 31 at the extreme left (Fig. 1). These feed rollers are actuated by the rack 93 which, due to the shape of the cam 118, will move to the left, thereby driving the lower feed rollers 33 (Fig. 1) in a clockwise direction, gripping the first card and feeding it past the sensing station during the next card cycle at which station the photocells P2 will be operative to detect the presence of a perforation.

Because of the fact that the discharge of the card from the magazine is through frictional means and may not be sufficiently precise, it is necessary to momentarily align each card in reference to each sensing station prior to sensing, and for this reason the extreme left-hand gate 42 (Fig. 1) is raised by the energization of the magnet RSM1 (Figs. 2 and 7B). Contacts FC11 close at about the time the first card starts to eject from the hopper LH, thereby elevating the extreme left-hand gate 42 by energizing magnet RSM1 over a circuit through contacts R33T. During the period in which the card is passing from the hopper LH to the gate 42, the feed rollers 31 are kept separated by the energization of magnet LFM2 in parallel with magnet RSM1.

Contacts FC11 open before the end of the first full cycle and allow the feed rollers 31 to re-engage and the first card gate 42 to drop. The feed rollers 31 now move at a uniform rate which synchronizes the passage of the index-point positions on the card past the photocells P2 with the contacts FC1 to FC6 which, it was explained above, control the entry of values into register A in accordance with the perforations representing the address. Thus, during the first half of the second full card cycle, the values punched in the card will be entered in the units and tens orders of the register.

Shortly after this, contacts FC8 (Fig. 7C) close and produce a positive pulse on wire W26 which is applied to the grid of the tube V5 (Fig. 7G), causing it to conduct and thereby initiate the comparison of numbers in the registers in the manner briefly explained above.

For convenience in explaining the operation, let it be assumed that the first card sensed corresponds in address indicia to the data for which a search is being made, thereby creating the equal condition which produces a negative pulse on wire W7. This will cut off tube V10 (Fig. 7C), render the tube V11 conductive, and energize equal relay R19 when contacts CC8 reclose toward the end of the second card cycle.

In Fig. 6A it will be noted that with respect to the feed rollers 28, 31, 32 and the gates 42, 42E, there are several different conditions indicated for each of these elements which prevail according to the type of cycle which may be involved. Condition No. 1 may be regarded as the most normal condition for convenience of description, and it will be noted that the feed rollers 32 are engaged slightly before the feed rollers 31 are disengaged. In other words magnet EFM2 is deenergized just before magnet LFM2 is energized. The magnet EFM2 (Fig. 7C) is controlled by contacts FC12 which are closed to cause a separation of the feed rollers 32 at the end of each cycle and the magnet is deenergized at the "12" point in the cycle (Fig. 6B) causing the feed rollers 32 under condition "1" to be engaged at this same time. Shortly thereafter the contacts FC11 (Fig. 6B) close for condition 1 and energize magnets RFM2, LFM2, separating the feed rollers 31. Thus the card will be carried by the feed rollers 32 past the right-hand feed rollers 32 to the gate 42 controlled by magnet RSM2, thus momentarily aligning the card with respect to the photocells P1. Just before the end of the cycle, contacts F11 open and deenergize magnet RFM2 enabling the right-hand set of feed rollers 31 to grip the card and carry it past the right-hand sensing station (Fig. 1). The magnet EFM2 is energized at about the same time by the closure of contacts FC12.

During the third card cycle the first card will be fed to the right past the row of photocells P1 into the right-hand hopper RH. Since equal relay R19 is now energized, relay R21P will be energized (Fig. 7B). Contacts CC9 (Fig. 7A) close early in this cycle and establish a holding circuit for the hold coil R21H. Contacts R21C (Fig. 7F) open and cause register B to be reset to zero. Relay R23 (Fig. 7B) is energized by the closure of contacts R21F and, by closing contacts R23A, has the effect of operatively connecting the photocells P1 for columns 3 and 4 to the entry circuits in place of the photocells P2 for columns 1 and 2. Thus the photocells P1 are now effective to sense columns 3 and 4 in which the searched-for data is to be found, rather than the address data, with the result that the searched data will be entered in register A in the same manner as the address data was entered. Just before the sensing of the card by the photocells P1 commences, contacts FC16 (Fig. 7F) open and automatically reset register A to zero by disconnecting wire W14B, to which the left-hand grids (terminals B) of the stages ST1, ST2, ST4, ST8 are connected from the bias wire W3.

Since the desired data was assumed to be found in the first card sensed, the operation of the machine has been completed with the feeding of only one card. The contacts CC13 (Fig. 7A) close shortly after the sensing of the card is completed and energize relay R25P (Fig. 7A)

through the contacts R21B and a holding circuit for this relay is established by the closure of contacts CC14 which energizes the hold coil R25H. Contacts R25B open and break the circuit for the magnet CFM which causes the feeding of cards to stop with the data on the first card in register A. Contacts R25D (Fig. 7C) also open and prevent a pulse through contacts FC8 from reaching the control grid of the tube V5. When relay R25P was energized early in the cycle, contacts R25C closed and caused condenser C3 (Fig. 7B) to became charged and it remains in this condition until this relay is deenergized, allowing contacts R25F to reclose. This momentarily energizes relay R27 by the discharge of the condenser and opens contacts R27B (Fig. 7A) to break the holding circuit for relay R13H. This stops the driving motor M. Relay R15H also is deenergized and prevents reenergization of the clutch magnet CFM. When relay R27 is energized, contacts R27A (Fig. 7C) close and momentarily light the signal light SL1 which informs the operator that the desired data is now in register A. If desired, the pulse to relay R27 may be utilized to start into operation some other piece of equipment which utilizes the data in register A and for this purpose the contacts R27C (Fig. 7C) may be connected by means of the wire W32 to the starting circuit of the additional equipment, such as a data processing machine generally designated DPM in Fig. 7C.

It will now be assumed that it is desired to search for data on a card which has address indicia of considerably higher sequence than the card discussed above which was assumed to be the first card in the batch. After the proper entry is made in register B, the machine will be started in operation and run in the same direction as before until an agreement between registers A and B is reached due to the desired address indicia being sensed by the photocells P2.

It might happen, however, that address data set up on the keyboard has a lower sequence than the one last sensed by the photocells P2 before the machine stopped. This requires that the direction of feed of the machine be reversed and that the photocells P1 now sense the address indicia and the photocells P2 the searched-for data. Since no address data has been entered in register A in consequence of the fact that no card has been sensed, it is necessary that one cycle of feed to the right ensue for the purpose of detecting in which direction the feed must ultimately operate in order to locate the searched data.

When the machine is started as above, it will normally for the type of operation under consideration, feed from left to right, as described above, which will result in entering in register A the address data from the first card sensed. Since it was initially assumed that the cards for this type of operation are in ascending sequence in the file according to the address indicia, the number entered in register A will be higher than the number entered in register B. The comparing circuits will function as in the above application to indicate that register A is higher than register B.

This is manifested by the fact that in some one stage of register A there will be a trigger on with its right-hand side conducting where the corresponding stage of register B will be off. For convenience, let it be assumed that this difference exists in stage ST3 (Fig. 7G) for the tens order. Since the right-hand side of stage ST8 for register A is now conducting with the right-hand grid at elevated potential, the gate V9 will be primed over wire W13 for conduction at the right-hand control grid. In this case the tube V5 corresponding to stage ST4 will not be primed for conduction since only tube V2 will be conducting and the equal pulse which is normally applied to the control grid of tube V5 will have no effect as such. However, since the suppressor grid of tube V5 is held at low potential by tube V3, the control grid of tube V8 will likewise be held at cut-off potential, thereby priming the gate V9 at the screen grids. Consequently, tube V9 will conduct when the equal pulse is applied to the control grid of tube V5 as described and will produce a negative pulse on wire W9 which will cut off tube V12 (Fig. 7C) and result in the application of a positive pulse from the anode of tube V12 through the switch S1 to the grid of the gas tube V13 causing it to conduct and energize relay R29 when contacts CC8 close "high." This occurs during the latter part of the cycle in which the card is sensed.

At the energization of relay R29 contacts R29A (Fig. 7A) close and energize relay R31P. The closure of contacts R31A permits closing a holding circuit for the hold coil R31H when the contacts CC9 close at the beginning of the next cycle. Contacts R29B open and stop the feeding of cards by preventing the reenergization of the magnet CFM at the end of this cycle.

While the feeding of cards stops, the motor M continues in operation for one complete idle cycle of revolution of the shaft 78 which drives the contacts CC13. The closure of these contacts during this idle cycle causes the energization of relay R33P (Fig. 7A) through the contacts FC7 and R31B. Relay R33P will be held by the closure of contacts R33A which establishes a circuit for the hold coil R33P and also the reverse magnet RM as follows: line wire W2, contacts R27B, error key contacts EKC, contacts R33A, and the magnet RM and coil R33H in parallel, to line wire W2. Relay R23 is also energized through the contacts R33D and R35A (Fig. 7B). The closure of contacts R23A, R33Y (Fig. 7E) has the effect of connecting the photocells P1 for columns 1 and 2 to the entry circuits for register A and the closure of contacts R33V renders the contacts FC1A effective. Also, the closure of contacts R33K, R33N switches the control from the contacts in the group FC3 to FC6 and FC9 to the group of contacts FC3A to FC6A, FC9A, respectively.

The effect of this operation is to cause the timing counter to be automatically preset to "15" prior to the sensing of the "1" index-point positions. Thus if a card were perforated "1" in a given column, the entry of "1" in the corresponding order of the register will cause it to be restored to zero in the same manner as described above in connection with the feeding of cards from left to right. On the other hand, if for example, the card were perforated "6" in a particular column, it will be noted that just prior to the sensing of "6" the stages ST2, ST8 of the timing counter will be turned on by the opening of contacts FC4A, FC6A, thus setting the register at "10" and immediately thereafter six negative pulses will be entered in the appropriate order of register A. The relay R33P, through its contact R33B, also shifts the control of the gates 42 from the magnets RSM1, RSM2 which are normally energized through contacts R33T to the magnets LSM1, LSM2 (Fig. 7B). Near the end of the idle cycle of shaft 78, contacts CC12 close and energize the magnet CFM to restart the feeding of cards. However, due to the fact that the reverse magnet RS was energized, the racks 93, 95 and the pinion 98 will be actuated in the opposite direction by the links 110a, 111a, 112a being coupled to the pins 113a, 114a, 115a with the result that the cards will be fed from right to left and the gates 42 controlled by magnets LSM1, LSM2 will be operative instead of the ones controlled by RSM1, RSM2.

The feeding of cards will continue until the address data entered in register B agrees with the address data on some card sensed by the photocells P1 for columns 1 and 2, whereupon the feeding of cards will be terminated and the data on the agreeing record will be entered in register A in exactly the same fashion as described above. However, in this case the entry of the searched-for data in register A will be under control of the photocells P2.

When the equal condition is detected in the registers, the relay R19 will be energized and energize relay R21P (Fig. 7B) as before and this will close a circuit to the relay R35 through the contacts R21G, R33E. Relay R35 opens contacts R35A to break the circuit for relay R23, thus re-opening contacts R23A and reclosing contacts R23B (Fig. 7E) to render the photocells P2 effective to sense the searched-for data designations in the card which caused the equality condition. After the data in the card has been sensed, the machine will stop, as described above.

Each time the machine is restarted to make a new search in consequence of the entry of new address data in register B, it will always run from left to right for the purpose of sensing a card to determine the direction in which the feed must ultimately be maintained in order to find the card identical in address indicia to register B. This characteristic is due to relay R33P being deenergized by the opening of contacts R27B when relay R13P is deenergized to stop motor M.

While the cards are feeding from right to left searching for the one having address indicia lower in value than the first card sensed, register A will continue to receive a value higher than register B until the sought-for card is sensed. Consequently, the grid of tube V12 will tend to be pulsed over wire W9 once each cycle and would otherwise cause the tube V13 to conduct and stop the machine. In order to prevent this action from taking place, contacts R33M of relay R33P are opened and prevent energization of relay R29 so that the machine continues to run until the address data on the card agree with register B. So far as the feeding can be said to be normal, the machine tends to always feed from left to right, and in the first example discussed above, where the first card contained the searched data, the sensing of cards for purposes of searching began immediately. In the second example it was necessary for the machine to feed one card from left to right in a test cycle for the purpose of determining if the desired address indicia should be on a card in hopper LH or hopper RH. It may happen that the operator might place all of the card in the right-hand hopper or that all of the cards were fed to that hopper in the course of a search. For example, the wanted card might be the last card during a left-to-right feed. Under these conditions the cards should feed continuously from right to left until the card with the desired indicia is sensed.

When the start key SK is depressed, with all the cards in hopper RH, contacts SKB close to impulse relay R13P, contacts R13D (Fig. 7A) close and momentarily energize relay R43 by a pulse through condenser C4. If all of the cards are in the hopper RH, contacts RHC will be closed and all of the others LHC, RCL1, RCL2, LCL1, LCL2, will be open. This permits a circuit to be established from line wire W1 (Fig. 7A), through the contacts R43A, R11B, R9A, R7A, R5A, R3A, R1B and relay R33P, to line wire W1, thus causing the reverse magnet RM to be energized immediately and, of course, the contacts of R33P change the control of the timing counter from the contacts FC3 to FC6, FC9 to the contacts FC3A to FC6A, FC9A, as described above.

In the foregoing examples it was assumed that the cards to be searched were arranged in some form of sequence by address indicia, as in serial order, in accordance with numerical address indicia and that the order would be ascending when the cards are fed from left to right; in other words, the lowest numbered card would be fed from the hopper LH first. It may happen that while the cards may be in order in accordance with one kind of indicia, it may be desirable to search for other data identified by indicia which is not in order in respect to the order of feed of the cards. For this operation the random switch S1 is opened to prevent the tube V13 from operating whenever the register A is high. As before, all of the cards may be placed in the left-hand pocket LH. The address indicia will be entered in register B by means of the keyboard and the start key SK depressed.

The machine will now function in the same manner as described in the first example described above, and will continue to feed cards from left to right until address indicia entered in register A under control of the photocells P2 agrees with the address indicia entered in register B. The machine will then function as described above to stop and, after the data in register A has been utilized, the operator may then enter other address indicia and resume searching. In this case, since the control of the tube V12 by the comparing circuits has been disabled, when the machine is restarted the cards will again feed from left to right until the address indicia on the sought-for card agrees with the address indicia in register B or hopper LH is exhausted. Since the cards are not in sequence in accordance with the address indicia, it may be that all of the remaining cards will be fed from the hopper LH into hopper RH without finding the pertinent card. In this case the control is operative to reverse the feed of the cards to cause the cards to be fed from hopper RH to hopper LH until the sought-for card is found or hopper RH exhausted. The reversal in feed occurs in consequence of the fact that the card lever contacts RCL1 will open when the last card has been fed from the hopper LH and subsequently contacts RCL2 will open. The opening of both of these contacts signifies that there are no more cards in course of feed from left to right and will cause the deenergization of both relays R3, R7 (Fig. 7C). This will permit a circuit to be established when contacts FC15 close (Fig. 6B) near the end of the cycle in which the last card is fed into the hopper RH. This circuit (Fig. 7C) extends from line wire W1, through contacts FC15, R21E, R25E, R33Q, R3C, R7B, and relay R47, to line wire W1. The contacts R47A close and cause the tube V13 to conduct and energize the "high" relay R29.

Since the cards are being fed from left to right, the reverse relay R33P is deenergized and permits the contacts CC8 (Fig. 7C) to energize relay R29. This relay has the same effect as was discussed above in the second example where it was found necessary to effect a reversal in the feed for the purpose of searching for a card which can only be found in the right-hand hopper RH under the condition discussed above. The cards will now feed from right to left until the address indicia on the sought-for card agrees with the address stored in register B, in which case the operation of the machine will be the same as first discussed above, the sought-for data on the card being entered in register A for utilization in other equipment.

It may happen that, due to an error, such as, for example, setting up the wrong address indicia by means of the keyboard or absence of the desired card from the batch, no matching card will be present in the file and all of the cards will be fed back into the left-hand hopper LH. When this happens, since relay R33P is energized for feeding from right to left, a circuit will be established from line wire W1 (Fig. 7C) through contacts FC15, contacts R21E (which open only when the equality condition is established), contacts R25E, R33R, R9C, R5B, and relay R37P, to line wire W2. The energization of relay R37P closes contacts R37A and causes the hold coil R37H to be energized and also lights the signal lamp SL2 which tells the operator that the card sought for is not found in the batch.

It will be noted in Fig. 7A that the holding circuit for the coil R37H extends over wire W22, through the error key contacts EKC, and contacts R27B to line wire W1. After the operator has investigated the error and perhaps added the desired card to the batch, the error key EK may be depressed, opening contacts EKC, and breaking the holding circuit for signal lamp SL2 and coil R37H.

The circuitry for the card lever and hopper contacts

RCL1, RCL2, LCL1, LCL2, LHC and RHC is so arranged that the machine may be started and will run properly when cards are in only one of the hoppers. In other words, the exhaustion of a hopper will not necessarily stop the machine, as it ordinarily would in machines of this type.

Under the conditions just described, the energization of relay R37P also opens contacts R37B (Fig. 7A) and deenergizes relay R15H. The effect of this is to stop the feeding of cards, by preventing energization of the card feed clutch magnet CFM, and the motor M will merely idle driving contacts CC8, CC9 . . . CC14, without feeding cards. While the relay R15P can still be pulsed by contacts CC13 once per revolution of shaft 78, this has no effect because the magnet CFM is pulsed at a different time and, unless a holding circuit is established for relay R15H, it is impossible to pulse magnet CFM. Thus, the feeding of cards cannot be resumed until the operator investigates and corrects the error. It is necessary for the operator to correct the error before depressing the error key K because the machine will automatically resume feeding as soon as the contacts R37B reclose. The operator will first ascertain if the error was due to a missing card or to the insertion of the wrong address data, and, after correcting these errors, will depress the reset key RK and enter the correct address data before operating the error key. When the error key is operated, relay R33P also is deenergized, since the holding circuit through coil R33H of this relay and the reverse magnet RM is maintained through the error key contacts EKC and contacts R27B. Thus, the machine will resume feeding from left to right automatically as soon as the error key is depressed and a search will then be made for the card having the corrected address indicia. When the machine is operating under the conditions described above, both for the case where the cards are assumed to be in sequence and the case where the cards are not in sequence in accordance with the search indicia, the timing conditions in Fig. 6A for the feed rollers and gates are designated with the small number "1" which may be considered as condition 1. Conditions 2, 3 and 4 occur only when the card ejecting mechanism is in use.

The machine is provided with card injecting and ejecting mechanism which is very useful in replacing or removing cards under certain conditions. For example, it may be desirable to search for and remove a card having certain data for the purpose of making corrections or, additionally, to replace the removed card with a corrected card. In another case, it might be desired to remove a card for purposes of correction or verification and temporarily substitute another card, such as one of contrasting color.

When it is desired to use the card inserting and ejecting mechanism, the switch S2 (Fig. 7B) is closed to place relay R39 and the eject clutch magnet ECM under control of equal relay R19. Let it be assumed that it is desired to insert a blank card of a distinguishing color in place of each card for which a search is made under control of the keyboard. Whenever a match is reached, regardless of whether the machine is running with the cards arranged in sequence or making a random search, relay R19 is energized, as described above, closing contacts R19A (Fig. 7B), thereby energizing relays R21P, R39P. Contacts R39A close and establish a holding circuit for the coil R39H over wire W23 and through contacts EC1 and also the eject clutch magnet ECM. This, it will be seen in Fig. 5A, couples the eject mechanism described above to the main driving mechanism. The energization of the magnet ECM couples the card injecting mechanism to the shaft 73 (Fig. 5A) by rendering the clutch 74 effective, thereby causing the cams 71 to be rotated to eject a card from the hopper EH and contacts EC1 to EC7 to function. Before this takes place, however, it is necessary to align the card to be ejected in the eject station and provide a channel for guiding the card to be inserted in its place. This channel is provided by the card stops 42E (Fig. 1).

When the relay R39P is energized, it allows the right-hand gate 42E (Fig. 1) to be raised through the energization of the magnet RSM (Fig. 7C) over a circuit traced from line wire W1, through contacts R33S, magnet RSM, and contacts R39D, to line wire W1. This action takes place near the end of the cycle in which the card with the agreeing address indicia is sensed and stops this card underneath the central feed rollers 32. Shortly thereafter, the magnet LSM is energized to raise the left-hand card stop 42E (Fig. 1). This takes place when contacts CC12 (Fig. 7A) close near the end of the card feeding cycle and energize relay R41P through the contacts R39C. The closure of the contacts R41B energizes magnet LSM in parallel with magnet RSM and the two card stops 42E not only stop the card in the eject position but form a channel which will guide this card out of the eject station at right angles to the line of feed of rollers 32 and will also guide a new card from hopper EH into said channel.

In order to eject a card, it also is necessary to withdraw the card stop 48 (Fig. 1) by energizing magnet ESM. This is effected by the closure of contacts EC3 (Fig. 7B) at the beginning of the eject cycle. Also contact EC7 closes and energizes magnet EFM1 which depresses the belt 52 into engagement with the card which is to be ejected. During the eject cycle which ensues, this belt, which is constantly driven by motor EM, will thrust the card out of the eject station and at the same time picker 67, actuated by lever 69, will push a new card into the eject station guided by gates 42E. The contacts EC3 are timed so that magnet ESM is deenergized in sufficient time for the card stop 48 to rise and arrest the inserted card in the eject station. Also, near the end of the cycle in which the matching card is fed into the eject station, the contacts FC13 close and energize magnet EFM2 through contacts R39H to disengage the feed rollers 31. During the eject cycle which ensues the contacts EC6 close and provide a holding circuit which maintains magnet EFM2 energized throughout most of the eject cycle. While the card which is to be ejected is being fed into the eject station, contacts FC10 close (Fig. 7B) and energize the magnets LFM1, RFM1 to prevent feeding of cards out of either of the hoppers LH, RH. During the eject cycle contacts EC4 (Fig. 7B) close before contacts FC10 open and maintain the magnets LFM1, RFM1 energized. The deenergization of these magnets near the end of the eject cycle and the deenergization of magnets LFM2, RFM2 permits card feeding from right to left to be resumed.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only by the scope of the following claims.

What is claimed is:

1. A storage device for data processing machines comprising two hoppers for receiving a file of records bearing data designations and identified by address designations, a pair of record sensing stations, each capable of sensing both the address designations and the data designations, reversible means to feed the records from either hopper to the other past first one and then the other of said sensing stations in succession, an address storage device, means for entering an address in said storage device, means controlled by said first sensing device for comparing the address designations on each record with the stored address, and means responsive to said comparing means for rendering said second sensing device effective to sense the data designations on a record having the stored address.

2. A storage device for data processing machines comprising a pair of receptacles for records bearing data designations and address designations identifying said data, a pair of address sensing devices, reversible means for feeding said records from one hopper to the other past first one and then the other of said sensing devices, means for setting up in the machine the address of certain data designations, means for comparing the setup address with the address designations, selective means for coupling the first sensing device to said comparing means during the passage of records from one hopper to the other, and means operative to reverse the feeding means and cause the selective means to connect the second sensing means to the comparing means during the passage of the records in the opposite direction.

3. A storage device for data processing machines, comprising a pair of receivers for records bearing address indicia, reversible means for feeding records in a path from one receiver to the other, a pair of address indicia sensing devices disposed along the path of feed of said records past which each record passes in succession, means responsive to the predetermined address indicia, selective means for coupling one or the other of said sensing devices to the responsive means and normally operative to couple a predetermined one of said devices to the responsive means when the records are feeding in one direction, and means for automatically reversing the feeding means and operating the coupling means to connect the other sensing device when the records feed in the reverse direction.

4. A storage device for data processing machines, comprising a pair of receptacles for records bearing data designations identified by address indica, reversible means for feeding said records in a path between said receptacles, a pair of devices for sensing the address indicia past which said records pass in succession in feeding from either receptacle to the other, means operable to eject a record from said path, means to set up in said machine a predetermined address, means to compare the set-up address with the address indicia, means operable to couple one or the other of said sensing devices to the comparing means according to the direction of feed of the records, and means rendered effective by the comparing means for rendering the ejecting means effective to eject the record having the set-up address.

5. The invention set forth in claim 4 in which additional means is provided, rendered effective by said comparing means, for inserting in said path a record to replace the record ejected.

6. The invention set forth in claim 3 in which additional means is provided for signaling the fact that the predetermined address data is not sensed in either of two alternate passages of records between said receivers.

7. In a data processing machine, means to successively sense a plurality of columns of index-point positions representing digital values in a record, in which positions data designations are selectively disposed to represent such digital values; a register having a plurality of orders, one for each column; and means for entering said digital values in said orders including an entry controlling counter, means operable at the sensing of each index-point position to preset said counter to a value equal to the difference between the capacity of the counter and the digital value of the index-point position, means for thereafter entering in the counter a number of units equal to the digital value of the index-point position, and means jointly controlled by the counter and the sensing means for entering in each order of the register corresponding to a column in which a designation appears in such index-point position a number of units equal to the value of such index-point position.

8. In a data processing machine, an electronic register comprising a plurality of orders, in which orders digital values are entered by different sequences of entry pulses, the number of pulses in each sequence representing a different digit; a series of entry pulse gates, one for each order, a plurality of sources, one for each order, of single timed pulses each representing one of the digits of a number to be entered in the register, each timed pulse of a source priming the gate for the associated order, an entry pulse timing counter, means operative at the time the digital pulses for each value are emitted for presetting the counter to a value equal to the difference between the capacity of the counter and the digital value of such timed pulses and also opening all gates corresponding to orders for which a timed pulse of such value is emitted, and means for pulsing said gates and said counter concomitantly to enter in the register a number of pulses equal to the digital values of the timed pulses.

9. In a data processing machine, a pair of registers, means to enter in one of said registers an address; a pair of receptacles for records bearing address indicia and data designations, reversible means to feed said records from one receptacle to the other, a pair of record sensing devices past which the records are fed, an address storage device, a data register, means to compare entries in the register with entries in the storage device, means to enter an address in said storage device, means to enter data in said register, selective means to initially couple one of said sensing devices to the data entering means when feeding in one direction and effective to connect the other sensing device to the data entering means when the feeding means is reversed, means automatically operative to reverse the feeding means when the records are exhausted from one receptacle and render the selective means effective to connect said other sensing device to the data entering means, and means controlled by the comparing means for disconnecting the operative sensing device from the data entering means and connecting the latter to the alternate sensing device when sensed address indicia agree with the stored address.

10. In a data processing machine, a pair of record sensing devices, each having an address sensing section and a data sensing section, reversible means to feed records bearing data designations identified by address indicia past first one and then the other of said devices, an address storage device, a data register, means to enter an address in the storage device, means to enter data in the data register, means to compare the address indicia with the entered address; alternate selective means effective in one direction of feed to first connect the data entering means to the address sensing section of a predetermined sensing device and then operable to connect the data entering means to the data sensing section of the other sensing device, said selective means being alternately settable for the reverse direction of feed to initially connect the address sensing section of the other sensing means to the data entering means and thereafter connect the data sensing section of the first sensing means to the data entering means, means controlled by the last record sensed in each direction of feed for setting the selective means according to the direction of feed of the records, and means controlled by the comparing means for rendering the alternate selective means operable to connect the data entering means to the appropriate data sensing section when the address indicia agrees with the entered address.

11. A storage device for data processing machines comprising two hoppers for receiving a file of records bearing data designations and identified by address designations, a pair of record sensing stations, each capable of sensing both the address designations and the data designations, reversible means to feed the records from either hopper to the other past first one and then the other of said sensing stations in succession, an address storage device, means for entering an address in said storage device, means controlled by said first sensing device for comparing the address designations on each record with the stored address, means responsive to said comparing means for rendering said second sensing device effective to sense the data designations on a record having the stored address, and means rendered effective by the exhaustion of one of said hoppers for reversing the feed and reversing the order of sensing of the sensing devices in the event the address in the storage device is not present in any record when the records are feeding in one direction.

12. The invention set forth in claim 11 in which means is provided for preventing further feeding of records when the stored address is not found on any record after an initial run in one direction and a second run in the opposite direction, said means being conditioned at the first reversal by exhaustion of records from one receptacle and disabled by said comparing means.

13. A storage device for data processing machines, comprising a pair of receivers for records bearing address indicia, reversible means for initially feeding records in a path from a predetermined one of said receivers to the other, a pair of address indicia sensing devices disposed along the path of feed of said records past which each record passes in succession, means responsive to the predetermined address indicia, selective means for coupling one or the other of said sensing devices to the responsive means and normally operative to couple a predetermined one of said devices to the responsive means when the records are feeding in the initial direction, means for automatically reversing the feeding means and operating the coupling means to connect the other sensing device when the records feed in the reverse direction, and means disabled by the responsive means for stopping the feeding of records and signalling the absence of a record having the predetermined address from a record.

14. In a data processing machine, an electronic register having a plurality of orders, each capable of receiving digital entries in the form of trains of pulses corresponding in number to the values of digits; a plurality of pulse entry switches, one for each order having an entry pulse input in common and separate switch conditioning inputs; a plurality of digit pulse sources, each connected to one of the conditioning inputs, and capable of emitting a single digit pulse at any one of a plurality of digit representing times, an entry controlling counter, means operative at each digit representing time to preset said counter to the difference between its capacity and the value of the digit pulses which may be emitted by any of said sources at such time, means operative at each digit time to pulse said counter and said common entry pulse inputs until said counter reaches zero, and means for terminating the further pulsing of said counter and said entry pulse inputs when it reaches zero.

15. In a data processing machine, a record sensing element for scanning a column of index-point positions representing digital values, in any one of which positions may appear a designation representing the digit corresponding to such position, a register order comprising a circuit capable of representing any digit when pulsed a number of times equal to a digit, an entry switch for controlling entries in said order having an entry pulse input and a control input, means responsive to a single pulse from said sensing element and connected to said control input for rendering said switch effective, an entry controlling counter, means operative at each digital index-point position to preset the counter to a value complementary to the digital value of such position, means rendered operative at each index-point position to pulse said counter and said entry pulse input of said switch an equal number of pulses, and means operative when the counter reaches a predetermined value to disable the responsive means whereby to cause a number of entry pulses to be entered in order equal to the digit value of a designation in one of said index-point positions.

16. In a data processing machine, means to successively sense a plurality of columns of index-point positions representing digital values in a record, in which positions data designations are selectively disposed to represent such digital values; a register having a plurality of orders, one for each column; and means for entering said digital values in said orders including a 1, 2, 4, 8 binary entry controlling counter, means operable at the sensing of each index-point position to preset said counter to a value equal to the difference between 16 and the digital value of the index-point position, means for thereafter entering in the counter a number of units equal to the digital value of the index-point position, and means jointly controlled by the counter and the sensing means for entering in each order of the register corresponding to a column in which a designation appears in such index-point position a number of units equal to the value of such index-point position.

17. In a data processing machine, an electronic register comprising a plurality of orders, in which orders digital values are entered by different sequences of entry pulses, the number of pulses in each sequence representing a different digit; a series of entry pulse gates, one for each order, a plurality of sources, one for each order, of single timed digital pulses each representing one of the digits of a number to be entered in the register, each timed pulse of a source priming the gate for the associated order, a binary pulse timing counter, means operative at the time the digital pulses of same value are emitted for presetting the counter to a value equal to the difference between the binary capacity of the counter and the digital value of such timed pulses and also opening all gates corresponding to orders for which a timed pulse of such value is emitted, and means for pulsing said gates and said counter concomitantly to enter in the register a number of pulses equal to the digital values of the timed pulses.

No references cited.